(12) United States Patent
Felstaine et al.

(10) Patent No.: US 10,116,514 B1
(45) Date of Patent: Oct. 30, 2018

(54) SYSTEM, METHOD AND COMPUTER PROGRAM FOR DEPLOYING AN ORCHESTRATION LAYER FOR A NETWORK BASED ON NETWORK FUNCTION VIRTUALIZATION (NFV)

(71) Applicant: Amdocs Development Limited, Limassol (CY)

(72) Inventors: Eyal Felstaine, Hertzeliya (IL); Ofer Hermoni, Yavne (IL); Itzik Kitroser, Beer Sheva (IL); Nimrod Sandlerman, Ramat Gan (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 219 days.

(21) Appl. No.: 15/083,150

(22) Filed: Mar. 28, 2016

Related U.S. Application Data

(60) Provisional application No. 62/140,353, filed on Mar. 30, 2015.

(51) Int. Cl.
*G06F 15/173* (2006.01)
*H04L 12/24* (2006.01)
*H04L 12/911* (2013.01)

(52) U.S. Cl.
CPC .............. *H04L 41/12* (2013.01); *H04L 47/70* (2013.01)

(58) Field of Classification Search
CPC ................................ H04L 41/12; H04L 47/70
USPC ....................................................... 709/223
See application file for complete search history.

(56) References Cited

U.S. PATENT DOCUMENTS

| | | | |
|---|---|---|---|
| 9,483,291 B1* | 11/2016 | Chen | G06F 9/45533 |
| 9,537,775 B2* | 1/2017 | McMurry | |
| 9,584,377 B2* | 2/2017 | Prasad | |
| 9,594,649 B2* | 3/2017 | Yang | G06F 11/202 |
| 9,634,936 B2* | 4/2017 | Bansal | H04L 45/30 |
| 9,674,343 B2* | 6/2017 | Foladare | H04M 3/42 |
| 9,690,683 B2* | 6/2017 | Skerry | H04L 41/0816 |
| 9,729,492 B2* | 8/2017 | Gvildys | H04L 51/30 |
| 9,740,513 B2* | 8/2017 | Gatherer | G06F 9/455 |
| 9,769,694 B2* | 9/2017 | Chou | H04W 28/0226 |
| 9,774,542 B2* | 9/2017 | Ramon Salguero | H04L 47/783 |
| 9,781,055 B2* | 10/2017 | Liu | H04L 47/783 |
| 9,806,975 B2* | 10/2017 | Xiang | H04L 67/10 |

(Continued)

*Primary Examiner* — Melvin H Pollack
(74) *Attorney, Agent, or Firm* — Zilka-Kotab, P.C.

(57) ABSTRACT

According to one aspect of the present invention there is provided a system, method, and computer program product for recovering a structure of network function virtualization orchestration (NFV-O) domains, including: providing an initial structure of NFV-O domains, the initial structure representing assignment of network resources to the domains; providing a current structure of NFV-O domains, the current structure representing a modification of the initial structure due to reassignment of network resources between the domains; identifying at least one network resource reassigned by at least a first domain to at least a second domain; and instructing the at least second domain to surrender the network resource to the at least first domain; wherein the at least one network resource is a part of a communication network using network function virtualization (NFV-based network) orchestration; and wherein the NFV-based network comprises a plurality of network resources assigned to domains managed by respective NFV-O modules.

4 Claims, 12 Drawing Sheets

(56) References Cited

U.S. PATENT DOCUMENTS

| | | | | |
|---|---|---|---|---|
| 9,838,253 | B2* | 12/2017 | Wang | H04L 41/0806 |
| 9,838,483 | B2* | 12/2017 | McMurry | H04L 67/16 |
| 9,843,479 | B2* | 12/2017 | Rosa de Sousa Teixeira | H04L 41/0816 |
| 9,843,488 | B2* | 12/2017 | Balabine | H04L 43/04 |
| 9,871,719 | B2* | 1/2018 | Lee | H04L 41/12 |
| 9,887,959 | B2* | 2/2018 | Wei | H04L 61/2007 |
| 9,892,007 | B2* | 2/2018 | Yang | G06F 11/203 |
| 9,912,558 | B2* | 3/2018 | Chou | H04L 43/08 |
| 2016/0156718 | A1* | 6/2016 | Allan | H04L 67/10 709/228 |
| 2016/0328258 | A1* | 11/2016 | Iwashina | G06F 9/45533 |
| 2016/0352634 | A1* | 12/2016 | Itsumi | H04L 12/6418 |
| 2017/0017512 | A1* | 1/2017 | Csatari | G06F 9/4856 |
| 2017/0063628 | A1* | 3/2017 | Rasanen | H04L 67/327 |
| 2017/0078143 | A1* | 3/2017 | Zhao | H04L 41/04 |
| 2017/0078216 | A1* | 3/2017 | Adolph | H04L 12/4641 |
| 2017/0083374 | A1* | 3/2017 | Yin | G06F 9/5027 |
| 2017/0111274 | A1* | 4/2017 | Bays | H04L 45/74 |
| 2017/0150399 | A1* | 5/2017 | Kedalagudde | H04W 28/08 |
| 2017/0208147 | A1* | 7/2017 | I'Anson | H04L 67/28 |
| 2017/0222889 | A1* | 8/2017 | Zong | H04B 1/385 |
| 2017/0244596 | A1* | 8/2017 | Chen | H04L 41/0803 |
| 2017/0244647 | A1* | 8/2017 | Jin | H04L 47/70 |
| 2017/0250870 | A1* | 8/2017 | Zhao | H04L 41/0893 |
| 2017/0257276 | A1* | 9/2017 | Chou | H04L 41/0896 |
| 2017/0272354 | A1* | 9/2017 | Chen | H04L 43/50 |
| 2017/0279635 | A1* | 9/2017 | Kerpez | H04L 41/32 |
| 2017/0302543 | A1* | 10/2017 | Wu | H04L 41/0803 |
| 2017/0317872 | A1* | 11/2017 | Zhu | H04L 41/065 |
| 2017/0329639 | A1* | 11/2017 | Morper | G06F 9/5005 |
| 2017/0331680 | A1* | 11/2017 | Ji | H04L 12/4641 |
| 2017/0332242 | A1* | 11/2017 | Teng | H04W 16/06 |
| 2017/0346676 | A1* | 11/2017 | Andrianov | H04L 41/0631 |
| 2017/0346831 | A1* | 11/2017 | Liu | G06F 9/455 |
| 2017/0373931 | A1* | 12/2017 | Liu | H04L 41/082 |
| 2017/0373951 | A1* | 12/2017 | Chastain | G06F 9/45558 |
| 2018/0004589 | A1* | 1/2018 | Liu | G06F 11/079 |
| 2018/0034781 | A1* | 2/2018 | Jaeger | H04L 63/0263 |
| 2018/0041914 | A1* | 2/2018 | Zhang | H04W 28/0247 |
| 2018/0060135 | A1* | 3/2018 | Lacey | G06F 9/5077 |
| 2018/0063741 | A1* | 3/2018 | Chou | H04W 28/16 |
| 2018/0063825 | A1* | 3/2018 | Van Phan | H04W 72/0406 |
| 2018/0069768 | A1* | 3/2018 | Zhang | H04L 41/5022 |

* cited by examiner

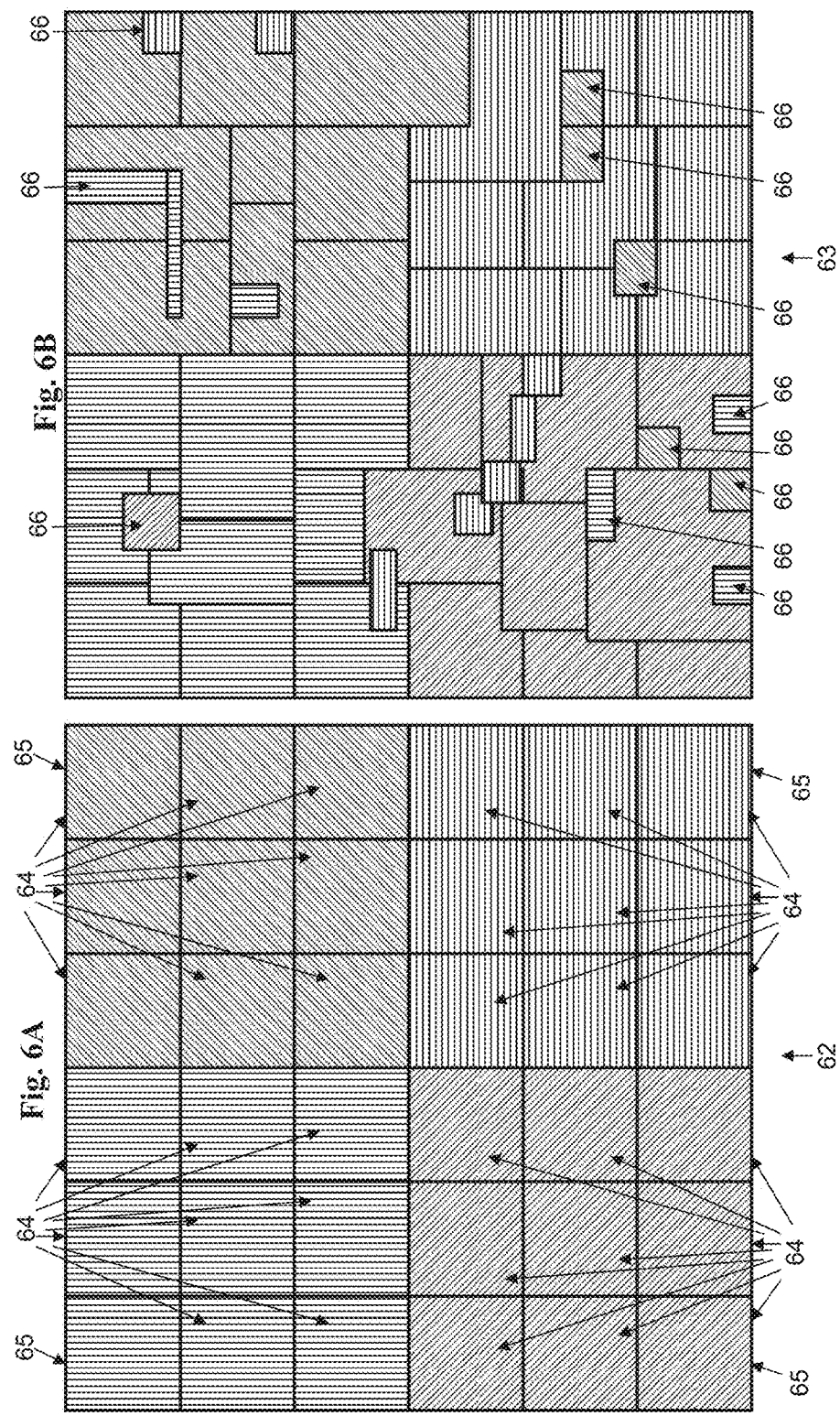

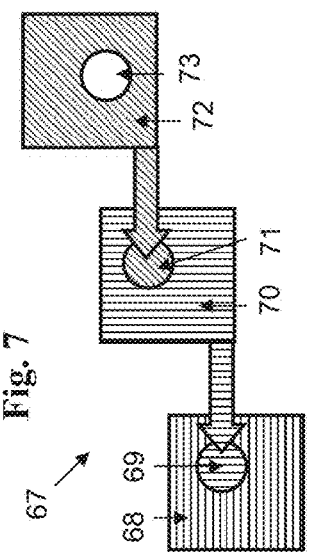
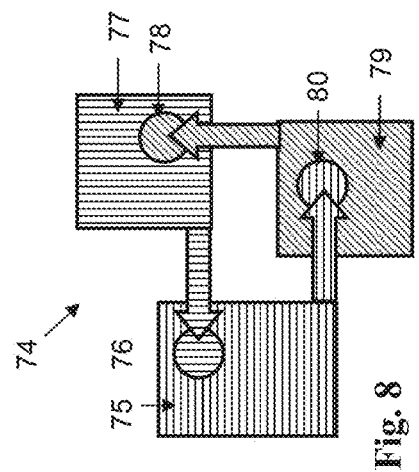
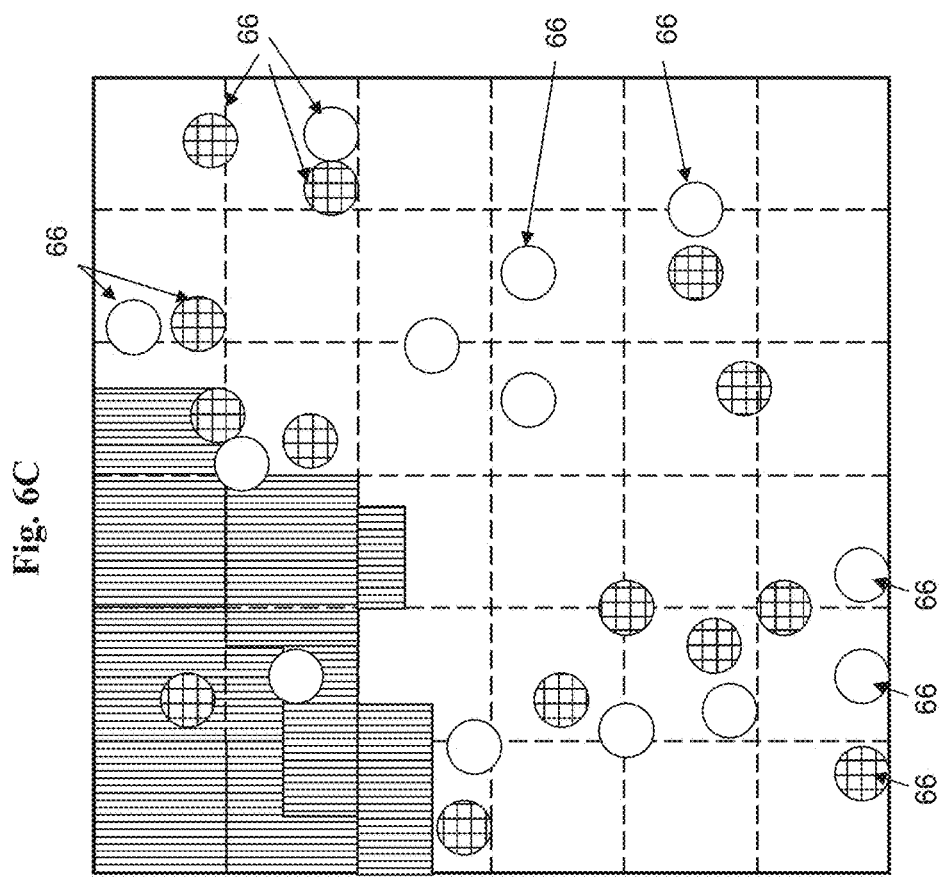

US 10,116,514 B1

SYSTEM, METHOD AND COMPUTER PROGRAM FOR DEPLOYING AN ORCHESTRATION LAYER FOR A NETWORK BASED ON NETWORK FUNCTION VIRTUALIZATION (NFV)

CLAIM OF PRIORITY

This application claims the benefit of U.S. Provisional Application No. 62/140,353, filed Mar. 30, 2015, the entire contents of which are incorporated herein by reference.

FIELD OF THE INVENTION

The present invention relates to telecommunications (telecom) and/or data communications and, more particularly, but not exclusively to network function virtualization (NFV) of telecom networks, and, more particularly, but not exclusively to managing the topology of the orchestration layer of an NFV-based network.

BACKGROUND

Network Function Virtualization is a term or a name of a proposed architecture of telecom services as published by the European Telecommunications Standards Institute (ETSI) in a series of documents available from the ETSI website. The purpose of NFV is separate the software from the hardware. NFV uses generic hardware platform and software adapted for the generic hardware platform. Thus, NFV creates a network much more flexible and dynamic than a legacy communication network. In NFV-based networks, a service is based on one or more virtual network functions or features (VNF) that can be executed on any generic hardware processing facility. Therefore, VNFs are installed, removed, and moved between hardware facilities, much more easily, less costly and thus, more frequently.

The NFV-based network is managed by a software program including an NFV orchestration (NFV-O) component. Typically, the NFV-O is responsible for installing, activating, and deactivating VNFs and VNF instances, as well as other functions of the NFV-based network. If two NFV-based networks should be connected, their respective NFV-Os should coordinate their functionality and activities. An NFV-O therefore manages in a typical processing unit a plurality of VNFs of various services provided by different VNF vendors.

The NFV-O layer is typically made of a plurality of NFV-O modules, where each module is responsible for a particular part of the network (domain or territory). Each NFV-O module is responsible for optimizing the deployment of VNFs and VNF instances and the allocation of network resources to the various VNFs and VNF instances within its domain (territory). The NFV-O deployment, that is the structure of network domains and their respective NFV-O modules, is optimized according to the network usage, however, deviations from the regular network activity may happen. For example, when an NFV-O module runs out of resources it may be allocated additional resources from near-by NFV-O modules. This process deviates the NFV-O deployment from the optimized topology and consequently may decrease the ability of the NFV-O modules to optimize the VNF deployment and resource allocation in run-time. There is thus a need for addressing these and/or other issues associated with the prior art.

SUMMARY

According to one aspect of the present invention there is provided a system, method, and computer program product for recovering a structure of network function virtualization orchestration (NFV-O) domains, including: providing an initial structure of NFV-O domains, the initial structure representing assignment of network resources to the domains; providing a current structure of NFV-O domains, the current structure representing a modification of the initial structure due to reassignment of network resources between the domains; identifying at least one network resource reassigned by at least a first domain to at least a second domain; and instructing the at least second domain to surrender the network resource to the at least first domain; wherein the at least one network resource is a part of a communication network using network function virtualization (NFV-based network) orchestration; and wherein the NFV-based network comprises a plurality of network resources assigned to domains managed by respective NFV-O modules.

Unless otherwise defined, all technical and scientific terms used herein have the same meaning as commonly understood by one of ordinary skill in the art to which this invention belongs. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

Embodiments of the invention are herein described, by way of example only, with reference to the accompanying drawings. With specific reference now to the drawings in detail, it is stressed that the particulars shown are by way of example and for purposes of illustrative discussion of several embodiments of the present invention only, and are presented in order to provide what is believed to be a useful and readily understood description of the principles and conceptual aspects of the invention. In this regard, no attempt is made to show structural details of the invention in more detail than is necessary for an understanding of the invention, the description taken with the drawings making apparent to those skilled in the art how the several forms of the invention may be embodied in practice.

In the drawings:

FIG. 6A, FIG. 6B, and FIG. 6C are simplified illustrations of an NFV-O deployment in three situations, in accordance with various embodiments;

FIG. 7 is a simplified diagram of a linear chain of domains connected by annexed resources, in accordance with one embodiment;

FIG. 8 is a simplified diagram of a circular or loop chain of domains connected by annexed resources, in accordance with one embodiment;

DETAILED DESCRIPTION

Figure 1:
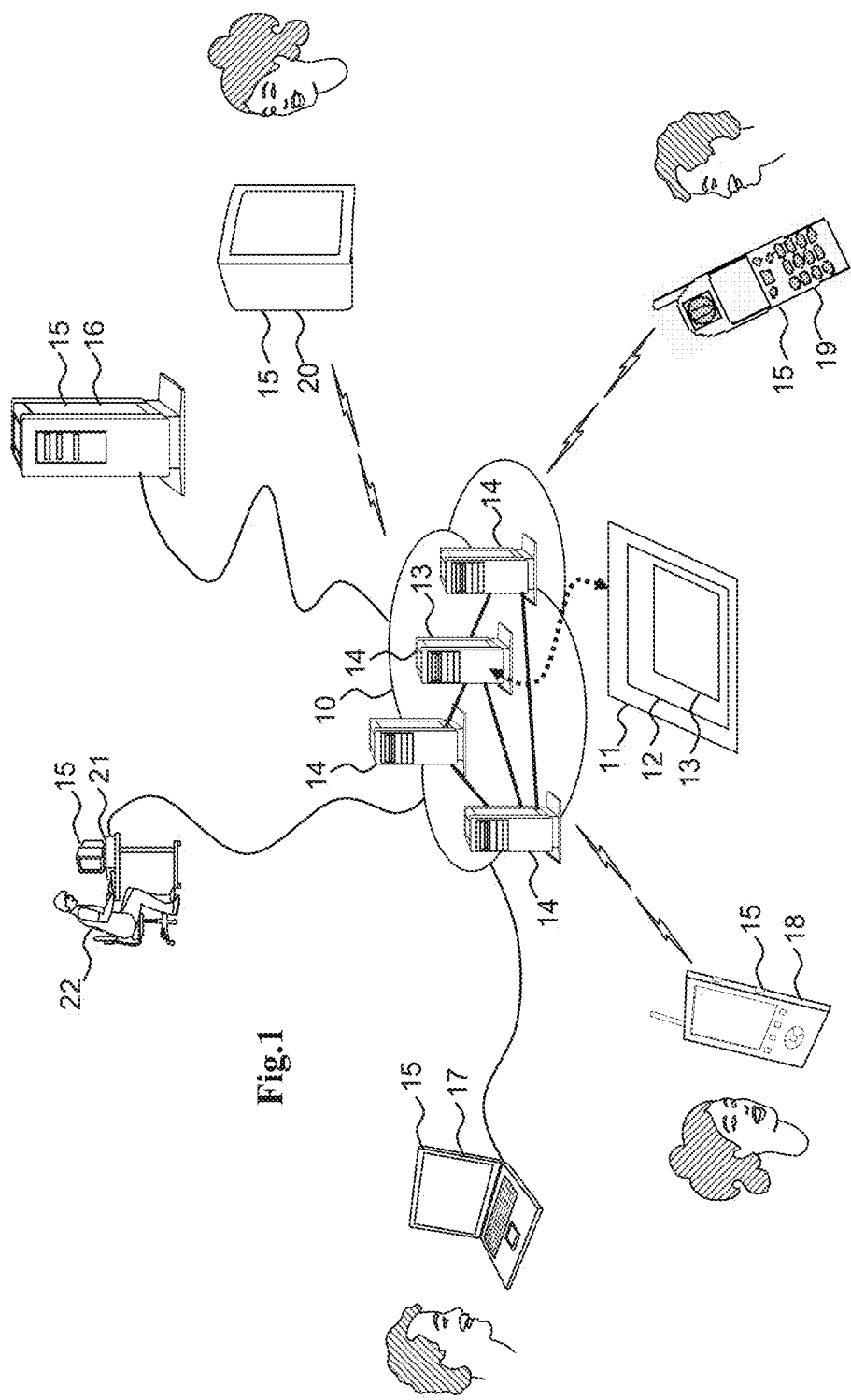
FIG. 1 is a simplified illustration of an NFV-based communication network, in accordance with one embodiment.

The present embodiments comprise a system, method, and computer program product for managing the topology and/or deployment of an orchestration layer in a communication network using network function virtualization.

In the context of the present description, the terms "network" and "communication network" refer to the hardware and software connecting one or more communication terminals including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. The term VNF refers to the software program implementation of the function or feature or service. The term VNF instance (VNF-I) refers to a particular process or task executing the VNF program by a particular processor or computing facility and/or used by a particular customer (or subscriber, end-user, terminal or server, etc.).

The term "service" refers to any type of use (such as a use case) that a NFV-based communication network may offer or provide to one or more communication terminals. A service may include switching data or content between any number of terminals, providing content from a server to a terminal or between servers, securing and protecting communication and content, processing content provided by the customer or by a third party, providing backup and redundancy, etc. A service may include one or more VNFs and/or one or more VNF instances forming a service sub-network. In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of a plurality of VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data.

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a network fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for coordinating the operation and/or orchestration of two or more NFV-based networks according to various embodiments of the present invention may be further understood with reference to the following drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different figures may use different scales and different scales can be used even within the same drawing, for example different scales for different views of the same object or different scales for the two adjacent objects.

Reference is now made to FIG. 1, which is a simplified illustration of an NFV-based communication network 10 including an NFV management system 11, an NFV-orchestration (NFV-O) layer 12, and an NFV-O management module 13, according to one embodiment.

As seen in FIG. 1, at least one NFV-based network 10 is provided. In the context of the present network architecture, the NFV-based network 10 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based network 10 may be provided.

NFV-based network 10 may include one or more computation facilities 14, each including one or more hardware units and interconnected by communication links to form the NFV-based network 10. At least one of the computation facilities 14 may include NFV management system 11. NFV management system 11 may include NFV-O module 12 and/or NFV-O management module 13.

NFV-O layer 12 may be a software program, or module. NFV-O layer 12 may therefore be named herein NFV-O module 12. NFV-O module 12 may be executed by one or more processors, or servers, such as computation facilities 14, of the NFV-based network 10. An NFV-O module 12 may be executed as an NFV-O instance or component. The NFV-O layer 12 may therefore include a plurality of NFV-O instances or components as will be further explained below. The term NFV-O 12 may therefore refer to the NFV-O layer, NFV-O module, NFV-O instance or NFV-O component, as relevant in the particular context.

NFV-O management module 13 may manage the topology, or deployment, of the NFV-O layer 12, and particularly, the topology, or deployment, of a plurality of NFV-O instances, or components. NFV-O management module 13 may be a part or a component of NFV-O module 12. However, NFV-O management module 13, NFV-O module 12 and NFV management system 11 may be separate software programs provided by different vendors. NFV-based network 10 may even have a plurality of any of NFV management systems 11, NFV-O modules 12 and/or NFV-O management modules 13.

A plurality of devices 15 are communicatively coupled to NFV-based network 10. For example, a server computer 16 and a computer or terminal 17 may be coupled to the network NFV-based network 10 for communication purposes. Such end-user computer or terminal 17 may include a desktop computer, a lap-top computer, and/or any other type of logic or data processing device. Still yet, various other devices may be coupled to the network NFV-based network 10 including a personal digital assistant (PDA) device 18, a mobile phone device 19, a (cable, aerial, mobile, satellite) television 20, etc. These devices 15 may be owned and/or operated by end-users, subscribers and/or customers of NFV-based network 10. Other devices 15, such as administration station 21, may be owned and/or operated by the operator of the NFV-based network 10.

Network administrator 22 may supervise at least some aspects of the operation of the NFV-based network 10 by controlling an NFV infrastructure including NFV management system 11, NFV-O 12, and NFV-O management module 13.

Figure 2:
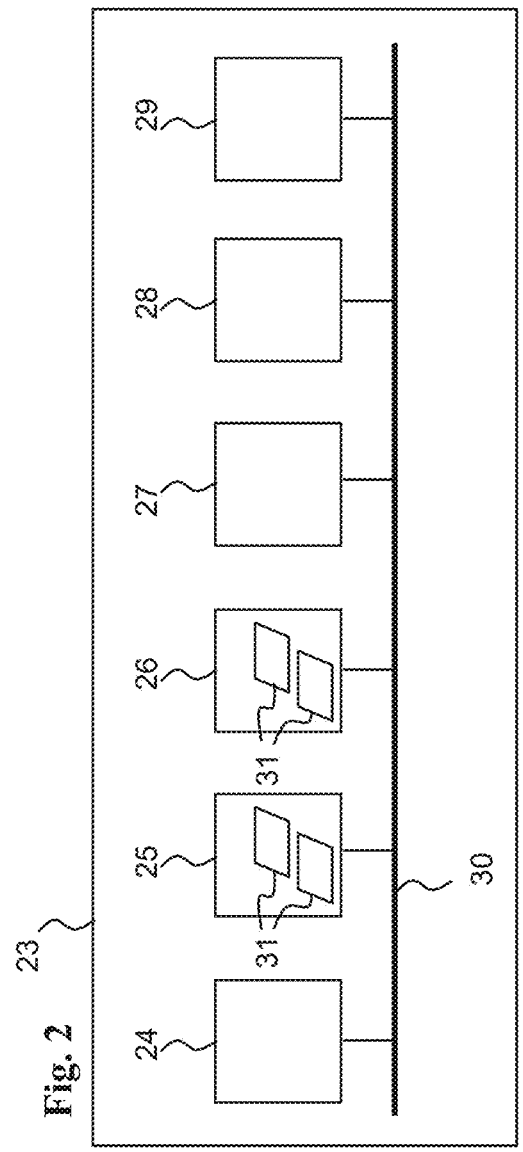
FIG. 2 is a simplified block diagram of a hardware unit of an NFV-based network, in accordance with one embodiment.

Reference is now made to FIG. 2, which is a simplified block diagram of a hardware unit 23 of an NFV-based network 10 according to one embodiment. As an option, the block diagram of FIG. 2 may be viewed in the context of the details of the previous Figures. Of course, however, the block diagram FIG. 2 may be viewed in the context of any desired environment. Further, the aforementioned definitions may equally apply to the description below.

In one embodiment, the hardware unit 23 may represent a computing facility such as computing facility 14 of FIG. 1 or a part of such computing facility, or may include a computing machine. The term computing machine relates to any type or combination of computing devices, or computing-related units, including, but not limited to, a processing device, a memory device, a storage device, and/or a communication device.

Hardware unit 23 may therefore be a network server, and computing facility 14 may be a plurality of network servers, or a data-center, including cloud-based infrastructure. As an option, the hardware unit 23 may be implemented in the context of any of the devices of the NFV-based network 10 of FIG. 1 and/or FIG. 4 and in any desired communication environment.

Each hardware unit 23 (or computing machine, computing device, computing-related unit, and/or hardware component), including each communication link between such hardware units, may be associated with one or more performance type and a respective performance rating or value, where the hardware unit and/or communication link is operative to provide the performance value. Performance types are, for example, processing power, cash memory capacity, regular memory capacity (RAM, dynamic, or volatile memory), non-volatile memory (such as flash memory) capacity, storage capacity, power, cooling, bandwidth, bitrate, latency, jitter), bit error rate, packet loss, etc.

Hardware unit 23 may be operative to provide computing infrastructure and resources for any type and/or instance of software component executed within the NFV-based network 10. In this regard, hardware unit 23 may be operative to process any of the processes described here, including but not limited to, any NFV-related software component and/or process. In this respect hardware unit 23 may be operative to process virtual network functions (VNFs), VNF instances, network function virtualization orchestration (NFV-O) software, modules and functions, data center management software, cloud management systems (CMS), etc.

In various embodiments, hardware unit 23 may include at least one processor unit 24, one or more memory units 25 (e.g., random access memory (RAM), a non-volatile memory such as a Flash memory, etc.), one or more storage units 26 (e.g. including a hard disk drive and/or a removable storage drive, representing a floppy disk drive, a magnetic tape drive, a compact disk drive, etc.), one or more communication units 27, one or more graphic processors 28 and displays 29, and one or more communication buses 30 connecting the above units.

Hardware unit 23 may also include one or more computer programs 31, or computer control logic algorithms, which may be stored in any of the memory units 25 and/or storage units 26. Such computer programs, when executed, enable hardware unit 23 to perform various functions (e.g. as set forth in the context of FIG. 1, etc.). Memory units 25 and/or storage units 26 and/or any other storage are possible examples of tangible computer-readable media.

It is appreciated that computer program 31 may include any of NFV management system 11, NFV-O 12, and NFV-O management module 13.

Figure 3:
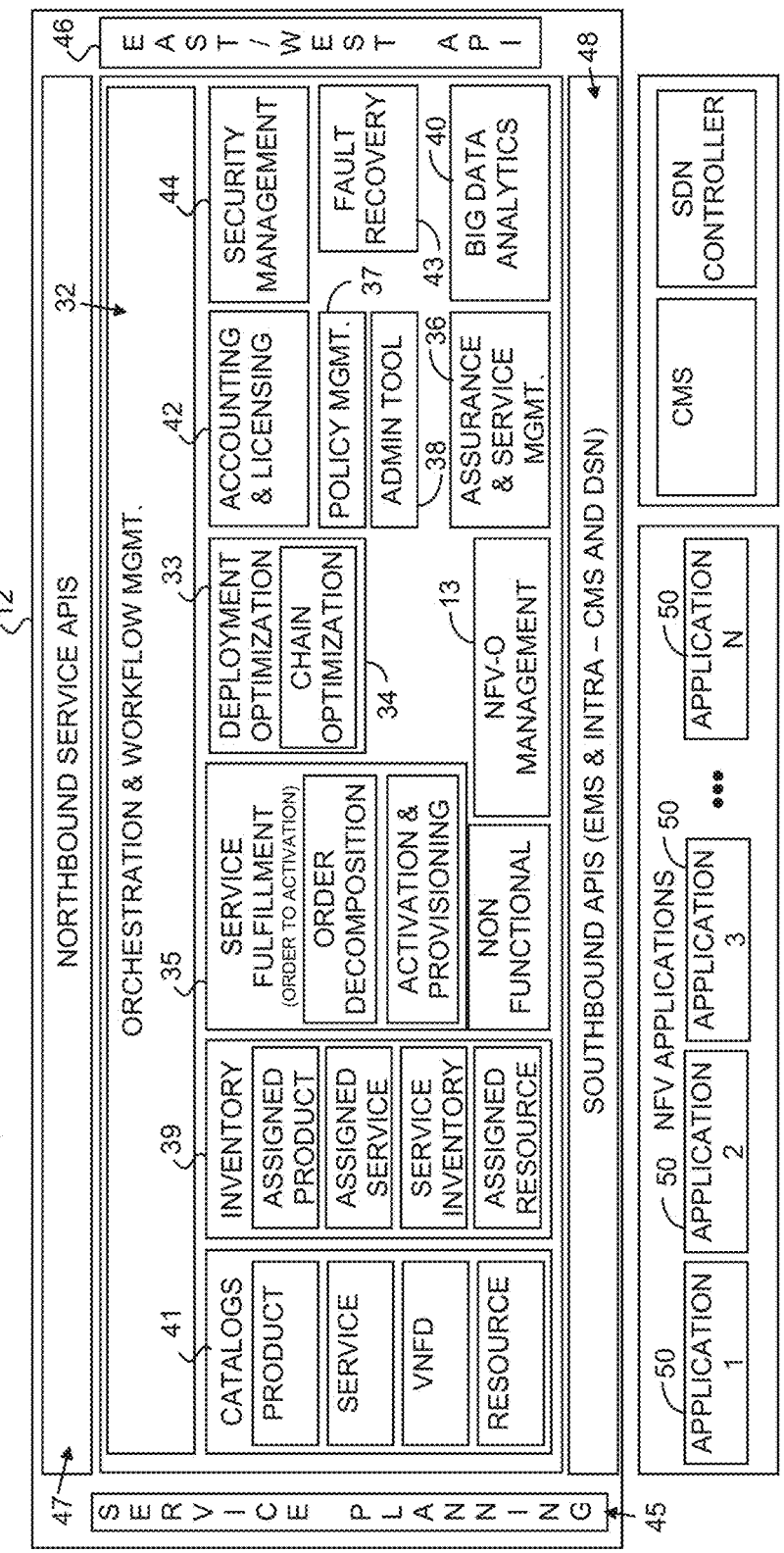
FIG. 3 is a simplified block diagram of NFV-infrastructure including network function virtualization orchestration layer (NFV-O), in accordance with one embodiment.

Reference is now made to FIG. 3, which is a simplified block diagram of a detail of NFV management system 11, including NFV-O module 12, and NFV-O management module 13, according to one embodiment.

As an option, NFV management system 11 may be implemented in the context of the details of the previous Figures. For example, in one embodiment. NFV management system 11 of FIG. 3 may represent the NFV management system 11 of FIG. 2. Of course, however, the NFV management system 11 may be implemented in the context of any desired environment. Further, the aforementioned definitions may equally apply to the description below.

In one embodiment NFV management systems 11 may include one or more NFV-O modules 12 and one or more NFV-O management modules 13.

In various embodiments, each of the NFV-O modules 12 may include orchestration and workflow management 32 that is responsible for managing (orchestrate) and executing NFV-O processes, including inbound and/or outbound communication and interfaces.

The NFV management systems 11 may include a VNF deployment optimization module 33 enables a user to devise automatic mechanisms for network optimizations. The VNF deployment optimization module 33 may operate these mechanisms automatically and continuously to optimize the distribution of VNFs 50 and their VNF instances 51 in real-time (or near-real-time) by migrating VNFs 50 and VNF instances 51 between hardware units 23.

The NFV management systems 11 may also include a chain optimization module 34. Chain optimization module 34 may be a part of VNF deployment optimization module 33 and may enable a user to devise automatic mechanisms for optimizing the deployment of chains or groups of VNFs 50 and VNF instances 51. A service provided by NFV-based network 10 is typically made of a particular chain or group of particular VNFs 50 and their respective VNF instances 51. Chain optimization module 34 optimizes the deployment of chains or groups or services between hardware units 23 according to the requirements and specifications associated with and/or adapted to the particular service, or chain, or a group.

Chain optimization module 34 may operate these mechanisms automatically and continuously to optimize in real-time the operation of chains or groups of VNFs 50 and their VNF instances 51 by re-planning their distribution among hardware units 23 and optionally also by migrating VNFs 50 and VNF instances 51 between hardware units 23.

Service fulfillment module 35 manages service and resource (VNF) instance lifecycle activities as part of the process and orchestration activities. This includes on boarding, initiation (instantiation), installation and configuration, scaling, termination, software update (of running VNF), test environment, and rollback procedure. Additionally or but optionally, this module may also provide decomposition of an order to multiple network services, and the activation of such network service as a single VNF instance 51, or as a chain of VNF instances 51.

Order decomposition includes translating business orders into network oriented service implementation plan. For example, a business order is decomposed into a plurality of functions, some of which may be provided by different software programs or modules (such as various VNFs 50) instantiated as a plurality of VNF instances 51 across one or more data centers. Performing order decomposition, service fulfillment module 35 typically consults VNF deployment optimization module 33 for the best deployment option to customer order in a given network and resource condition. Performing order decomposition, service fulfillment module 35 then initiates the service including all its components. Order decomposition is performed in several locations across the NFV-O hierarchy, i.e., initial decomposition is performed in the root of the NFV-O, and then further decomposition is performed in the relevant data centers.

Activation and Provisioning provides the plan for activation and provisioning of the service to the orchestration and workflow management. It also provides feedback on fulfillment status to upper layer. This upper layer is typically the business support services (BSS).

Assurance and Service Management module 36 gathers real time data on network elements status and creates a consolidated view of services and network health. The module also triggers events associated with lifecycle management and faults. This module monitors the health of the network and executes fault recovery activities. The assurance module provides the ability to monitor services' status and performance according to the required criteria. The assurance module interacts with the network infrastructure (including computing, storage and networking) to receive the required information, analyses it and acts upon each incident according to the defined policy. The assurance is able to interact with analytics to enrich the policy assurance module. Interfaces are also provided for implementation by an external system.

Policy management module 37 enables a user to define and configure offline and/or real-time policy for controlling VNF and service related rules. The module contains the preconfigured policies and activities as well as selection rules for the NFV-O process to determine the preferred policy or activity to be performed for a particular process event. The policy management is multi-layered, including vendor policy, service policy, operator policy, etc. The policy mechanism triggers the suitable policy layer (vendor/service/operator).

Administration module 38 provides an overall view of the network, manual lifecycle management and intervention, and manual system administration and configuration. The module enables a user such as administrator 22 to manage, view, and operate the NFV-O system. The module also provides a view of the network topology and services, the ability to perform specific activities such as manual lifecycle management, and changing service and connectivity configuration.

Inventory management module 39 maintains a distributed view of deployed services and HW resources. Inventory catalogues reflect the current instantiation and allocation of the resources and services within the network mapped into products and/or customer entities.

Big data analytics module 40 analyzes network and service data to support network decisions involving services and subscribers to improve network performance based on actual usage patterns. The module also generates what-if scenarios to support business-oriented planning processes. Additionally the module analyses and evaluates the information for various planning aspects (Virtual Network Capacity Planning, Data Center Capacity Planning, Value based planning, Cost analysis for network deployment alternatives, etc.) deployment and management (Guided Operator Recommendations, What-if scenario analysis and simulation, application rapid elasticity and resource usage optimization etc.), and supports business-oriented planning processes.

A catalog module 41 include records defining various aspects of the network, such as products, services, and resources such as hardware units and VNFs (VNF directory). The catalog module 41 is typically a collection of centralized, hierarchical information repositories containing resource, service and product definitions with their relationship, versioning, descriptors etc. Such records typically include templates enabling a user such as administrator 22 to define particular network components such as resources, products, services, etc. A resource template defines resources descriptors, attributes, activities, procedures, connectivity, etc. A service template defines a service variation from resource building blocks. A product template defines parameters of a sellable product (prices, rating, etc.) based on service composition (this may be part of BSS catalogue).

Inventory management module 39, big data analytics module 40, and/or catalog module 41 may support multiple data centers, multiple CMSs and provide centralized view across the infrastructure. Inventory management module 39, big data analytics module 40, and/or catalog module 41 may also support hybrid networks and services maintaining both physical and virtual resources.

Accounting and licensing module 42 records and manages network software usage data for commercial purposes including licensing, accounting, billing, and reconciliation of services with subscribers and providers. The module manages licensing and usage of virtual network application, ability to support complex rating schemes, based on various parameters such as CPU, memory, data, etc. The module enables users to define the pricing of particular VNF modules and provide settlement with vendors. The module also enables the evaluation of internal costs of services provided within the network for calculating ROI.

Fault recovery module 43 (otherwise named disaster recovery planning module or DRP) enables a user to plan and manage disaster recovery procedures for the NFV-O and the entire network.

Security management module 44 provides the authentication authorization and accounting services of application security across the network.

The authentication module and function (including identity management) authenticates the identity of each user defined in the system. Each user has a unique user identity and password. The system supports password based authentication with flexible password policy. Integration with external authentication providers can be done via additional system enhancements.

The authorization module and function supports role-based access control (RBAC) mechanism, where each user is assigned with one or more roles according to the business needs based on the least privileges concept (for example, standard or administrator roles).

Accounting module and function provides audit of security events such as authentication or login events.

The security module use rules to protect sensitive information, for example: that the data accessed is used for the specific purposes for which it was collected; that sensitive information is encrypted when in storage and transit, and masked/truncated on display and logs; that the entire security system is deployed in the customer's intranet network (behind network/infrastructure measures), in an independent domain.

Secure Development Life Cycle (SDLC) ensures that security aspects are handled during the project's life cycle, such as security design, security testing, etc.

Service planning module 45 is typically used by CSP sales representative, enterprise, and/or technician, as part of selling engagement process with enterprise/SMB customers.

The module provides the ability to interact with catalogues, customer data, network and ordering system to provide online network service proposal for the enterprise customers with ability to quote update the proposal, validate the serviceability and network inventory and once done provide the service order for activation using the northbound interface.

Service planning module 45 is also used to define/build new services, both internal (core) services and services that are sold to the customer (consumer or business). The definition of the service includes the elements that comprise the service, such as VNFs and VNF instances, and the connectivity between the different elements. In case of a customer service, a new product will be offered in the product catalog.

NFV-O management module 13 manages the topology, or the deployment of NFV-O 12, including redeployment and recovery, as described in further details below.

East/west APIs 46 includes the following main domains/activities interfaces:information source to big data repository; interacting with the physical network system (OSS); and hybrid network management supporting services that are composed of virtual and physical elements, such as a security service composed of virtual firewall and physical DDoS box. In case of hybrid service, the NFV-O decomposes the entire order, executes the virtual part of the order, and forwards the physical part of the order to OSS to fulfil (and report) the order.

Northbound APIs 47 provides Application programming interface (API) to the following external software packages: Business support system (BSS) for service order fulfillment, cancel and update activities, status notification, resource inventory view, etc., monitoring system, assurance system, service planning tool, administration tool for system view and configuration, and big data repository.

Southbound APIs 48 provides APIs for the following external software packages: CMS—service and VNFs life-cycle activities—receiving from the infrastructure status and monitoring information for upstream system and activities (e.g., assurance); SDN Controller (or other connectivity system) to configure inter and intra data center connectivity; and EMS to configure the VNF.

Figure 4:
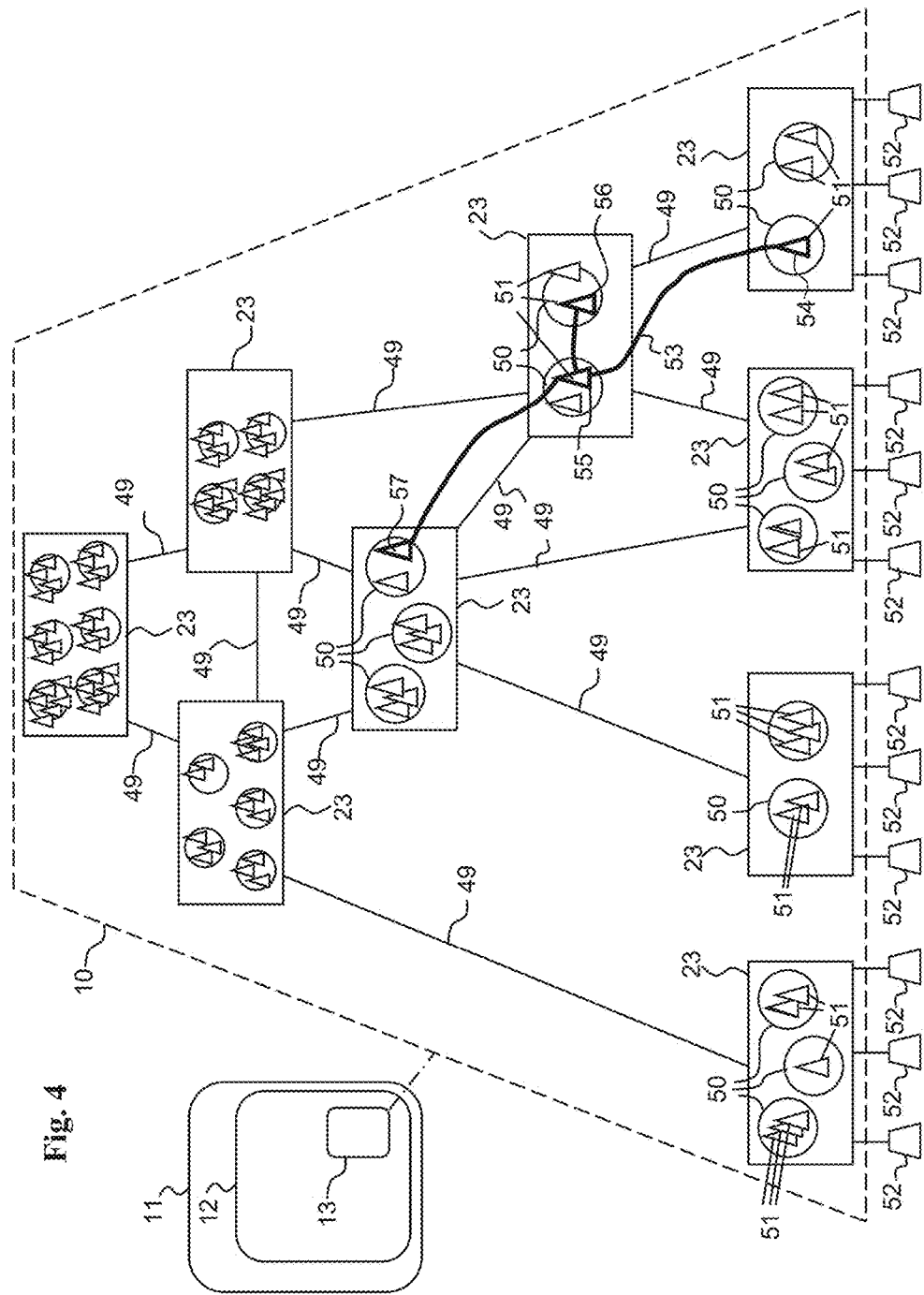
FIG. 4 is a simplified block diagram of services deployed in NFV-based network, in accordance with one embodiment.

Reference is now made to FIG. 4, which is a simplified block diagram of a deployment of an NFV-based network 10, according to one embodiment.

As seen in FIG. 4, NFV-based network 10 includes hardware units 23 connected via transmission lines 49, and VNFs implemented as software programs 50 installed in hardware units 23. Some of hardware units 23 are directly connected to a customer. The customer may be a subscriber, an end-user, or an organization, represented herein as a terminal or a server 52 or a plurality of terminals and/or servers 52. NFV-based network 10 typically includes NFV management system 11, an NFV-orchestration (NFV-O) 12, and NFV-O management module 13.

As seen in FIG. 4, several, typically different, VNFs 50 can be installed in the same hardware unit 23. Additionally, the same VNF 50 can be installed in different hardware units 23.

A VNF 50 is typically executed by a processor of the hardware unit 23 in the form of a VNF instance 51. Therefore, a particular VNF 50 installed in a particular hardware unit 23 may be "incarnated" in (initiated, executed as) any number of VNF instances 51. Typically, the VNF instances 51 are independent of each other. Typically, each VNF instance 51 serves different terminals and/or servers 52. NFV-based network 10 connects to and between communication terminal devices 52 typically operated by one or more customers, subscribers, and/or end-users.

It is appreciated that a network operator may manage one or more services deployed in the customer's premises. Therefore, some of the hardware units 23 may reside within the premises of the network operator while other hardware units 23 may reside in the customer's premises. Similarly, a server such as server computer 16 of FIG. 1, being a terminal devices 52 of FIG. 4, may reside in the premises of the network operator or in the customer's premises. Consequently, when the network operator provides and/or manages one or more services for a customer's terminal devices 52 such as server computer 16, the NFV-based network 10 of the network operator directly manages the VNFs 50 providing the services and their VNF instances 51.

In such situation the NFV-based network 10 manages the services irrespectively of the location of the terminal devices 52 (e.g., server computer 16), whether in the premises of the network operator or in the customer's premises. In other words, the NFV-based network 10 may be managing VNFs 50 and VNF instances 51 providing the services, as well as the terminal devices 52 (e.g., server computer 16) being co-located within the same computing device (e.g., hardware unit 23), whether in the premises of the network operator or in the customer's premises.

A service provided by the communication network may be implemented using one or more VNFs. Otherwise put, a service is a group, or a chain of interconnected VNFs. The VNFs making the group, or the service, may be installed and executed by a single processor, by several processors on the same rack, within several racks in the same data-center, or by processors distributed within two or more data-centers. The present invention relates to optimizing the deployment of a service in a communication network using network function virtualization, and to optimizing the deployment of a group, or a chain, of virtual network functions (VNFs) in an NFV-based network. Therefore the term "chain optimization" refers to the planning and/or managing the deployment of VNFs making a chain, or a group, of VNF providing a particular service.

For example, FIG. 4 shows a first service 53, including VNFs 50 and their respective VNF instances 51 designated by numerals 54, 55, 56, and 57 and a thick line. In this example the group or chain of the VNFs 50 making first service 53 are connected as a chain of VNFs 50. However, the VNFs 50 making a service can be connected in any conceivable form such as star, tree-root, tree-branch, mesh, etc., including combinations thereof. It is noted that a VNFs 50 may be executed by two or more VNF instances 51, such as VNF 54.

The deployment of the group or chain of the VNFs 50 making first service 53 is therefore limited by constraints such as the capacity of the communication link 49 bandwidth and/or latency (delay).

Typically, a VNF 50 has a list of requirements, or specifications, such as processing power, cash memory capacity, regular memory capacity (RAM, dynamic, or volatile memory), non-volatile memory (such as flash memory) capacity, storage capacity, power requirements, cooling requirements, etc. A particular VNF instance 51 providing a particular service (to a particular customer) may have further requirements, or modified requirements, for example associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for roll-back and/or recover, fault-tolerance, fail-safe operation, etc.

Typically, a service made of a chain or a group of VNF 50 and their VNF instances 51 has a similar list of requirements, or specifications, covering the service as a whole. Therefore such requirements, or specifications, imply, affect, or include, requirements, or specifications, regarding communication links between VNFs 50 and/or VNF instances 51. Such requirements, or specifications, include bandwidth, latency, bit-error rate, packet loss, etc. Such communication requirements or specifications further impose deployment limitations, or constraints, requiring particular VNFs 50 and/or VNF instances 51 to reside in the same data-center, or within the same rack, or even in the same computing device, for example, sharing memory or executed by the same processor.

Security measures add further requirements, or specifications, such as co-location of some VNFs 50 and/or VNF instances 51.

NFV-based network 10 has a hierarchical structure. There are at least four aspects of the hierarchical structure of NFV-based network 10. The networking or traffic aspect refers to the arrangement of the transmission lines between hardware units 23. The processing aspect refers to the arrangement of the hardware units 23. The software aspect refers to the arrangement of the VNFs 50. The operational aspect refers to the arrangement of the VNF instances 51.

An important aspect of the optimization process in an NFV-based network is that it is based on real-time needs, rather than long-term, statistically anticipated, needs. The only limitation on network reconfiguration in NFV-based network is that it does not result in a deterioration of any of the current services. NFV deployment module 33 enables, and manages, migration of services between hardware units 23, VNFs 50, and VNF instances 51 in real-time, without affecting the availability of a service, and while securing service and session continuity.

The term "continuous" here means that VNF deployment optimization module 33 and and/or chain optimization module 34 perform the relevant optimization task or process in run-time, or real-time, or online, or on-the-fly, or repetitively and without adversely affecting the network's functionality and its services.

Unlike a legacy network, the NFV-based network has two topologies: the topology of the hardware devices, and the topology of the VNFs (the distribution of VNFs among the hardware devices). The topology of the hardware network is relatively stable, while the VNF topology can be optimized in real-time. Another major benefit of the NFV-based network is that modifying the software topology (the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

It is therefore advantageous to localize NFV-O 12, and particularly the deployment optimization processes associated with VNF deployment optimization module 33 and chain optimization module 34 to reduce the cost as discussed above, and simultaneously to secure the possibility to expand the scope of the network managed by these processes, if so needed.

Figure 5:
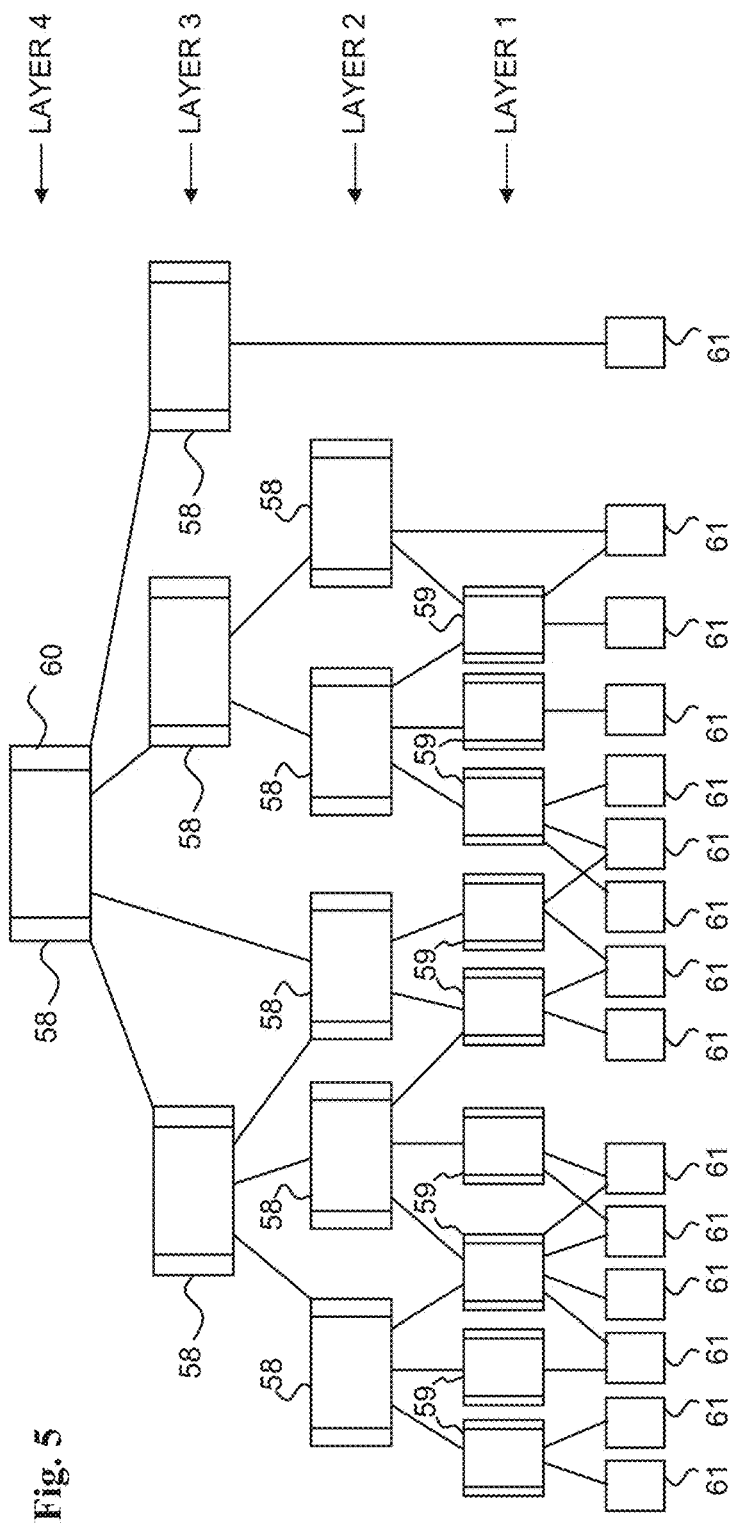
FIG. 5 is a simplified block diagram of a distributed deployment of NFV-O, in accordance with one embodiment.

Reference is now made to FIG. 5, which is a simplified block diagram of a distributed deployment of NFV-O 12, according to one embodiment.

The distributed architecture of NFV-O 12 enables faster response to local events on one hand, and improved scalability on the other hand. In a distributed NFV-O 12 architecture, decision processes are performed in self-contained and local decision points, closer to the customer, and closer to the events (such as network or security faults).

The hierarchy of a distributed NFV-O 12 can be viewed as a tree of two component types: core component 58 and leaf component 59. NFV-O core component 58 can be a child of another core component 58, and/or a parent of one or more core components 58 or leaf components 59. A leaf component 59 cannot be a parent of a core component 58 or a NFV-O module 12.

Orchestration parameters managed by a particular leaf component 59 or core component 58 are reported in real-time to the supervising (parent) core component 58. In addition to the supervision, this continuous updating process enables the supervising component to provide backup, and/or support recovery processes associated with hardware and/or software faults as well as security faults and/or breeches.

To provide redundancy a leaf component 59 may be supervised by (i.e. subordinate of) two or more core components 58, and child core components 58 may be supervised by two or more parent core components 58. The orchestration parameters managed by a particular core components 58 or leaf component 59 are also mirrored to the backup core components 58. Optionally, NFV-O Core components 58 have the same fully functional orchestration capabilities while leaf components are limited to simple, well defined and localized sub-orchestration tasks, and thus may provide a faster response to demands and changing load.

It is appreciated that core components 58 and leaf component 59 may be organized in layers such as layers 1, 2, 3 and 4 shown in FIG. 5. The highest layer (e.g., layer 4 of FIG. 5) may include a single core component 58 functioning as a root NFV-O module (such as core component 58 designated by numeral 60). It is appreciated that in some situations there may be more than a single root component, for example, in situations having a plurality of overlapping hierarchies, or in situations having a plurality of NFV-based networks 10.

A cloud management system (CMS) 61 is a software package managing one or more hardware units 23 operating one or more VNFs 50 and executing one or more VNF instances 51. A CMS 61 can be managed by one or more leaf components 59 or core components 58, or combinations thereof. A CMS 61 can be located in the operator's premises or in the customer's premises or partly in both.

An NFV-O component such as a core components 58 or a leaf component 59 typically orchestrates a particular, predefined, domain. The domain may be one or more cloud management systems 61, one or more services, one or more customers, etc. Therefore, there can be an overlap between domains of different NFV-O components. For example, one NFV-O component orchestrates a CMS 61, another NFV-O component orchestrates a service that is at least partly provided the same CMS 61, and additionally a third NFV-O component orchestrates services for a particular customer connected to that same CMS 61.

If, for any reason, the first responder NFV-O component cannot resolve the problem, for example for lack of adequate or sufficient resources within the domain of the particular NFV-O component, the problem is escalated above to the supervising or parent NFV-O component.

The NFV-O is a central component of the network as a system and as such presents a major risk. An attack against the NFV-O may result in a total network outage. Securing the NFV-O is therefore a goal and a challenge. A distributed NFV-O architecture enhances the network resilience/endurance. When an attack on a particular instance of the NFV-O is detected the NFV-O instance is isolated and its functionality is transferred to one or more other NFV-O instances.

Another aspect of NFV-O hierarchy is stratified granularity, or resolution, of the orchestration process. An NFV-based network 10 may include a very large number of hardware elements (processors, memory units, storage units, communication links, etc.) and an even larger number of VNFs 50 and VNF-instances 51. Each of the VNF-instances 51 have a number of requirements (such as processing power, memory size, storage size, communication bandwidth, latency and jitter, etc.). Each of these hardware elements and software modules produce a number of load values (typically corresponding to their respective requirements).

All this creates a large amount of data that should be processed continuously or repeatedly to determine possible adverse conditions (e.g., a particular overload) or a potential cost saving situation. Such situation may require deployment optimization (e.g., the planning of a newly optimized deployment of VNF-instances 51) and redeployment (implementing the optimized deployment). The NFV-O hierarchy enables scalability of the redeployment optimization process by distributing the process in a hierarchical manner.

One optional aspect of hierarchical deployment optimization is that higher levels in the NFV-O hierarchy processes deployment optimization in a coarser granularity (or resolution), while lower levels in the NFV-O hierarchy processes deployment optimization in a finer granularity (or resolution).

For example, while a leaf component 59 manages its part (domain) of the NFV-based network 10 in terms of particular hardware elements (e.g., processors, memory units, storage units, communication links, etc.) and software elements (e.g., VNFs 50 and VNF-instances 51) a core component 58 may manage its part (domain) of the NFV-based network 10 in terms of whole subordinate (child) core components 58 or leaf components 59 it supervises. Thus, such parent core component 58 performs deployment optimization in terms of requirements and load values applied to whole subordinate (child) core components 58 or leaf components 59.

A customer may use the services of several telecom operators. For example, an international company operating in several countries. Such a customer usually establish a virtual private network (VPN) across this plurality of telecom operators. Considering that these operators now operate NFV-based networks, the customer may establish a service including a plurality of VNFs where different VNFs are part of different networks. Managing such inter-operator VNF-chain, or service, requires tight coordination across different NFV-based networks. Such coordination can be implemented using the following methods: enabling tight coordination between NFV-Os of the different NFV-based networks; and establishing an inter-network NFV-O module that manages one or more inter-network VNF-chains, or services of a particular customer.

Optionally, and perhaps preferably, such inter-network NFV-O supervises two or more child or leaf NFV-O modules, each within a particular NFV-based network incorporating an NFV participating in the particular VNF-chain or service.

It is appreciated that NFV-Os of different operators may be provided by different NFV-O vendors.

As described above, a major task of NFV-O 12 is to manage the deployment of VNFs 50 and VNF instances 51, particularly to avoid overload, avoid failure to meet SLA and/or QoS requirements, etc. In a first network configuration a single NFV-O module 12 manages the deployment of VNFs 50 and VNF instances 51 throughout the entire NFV-based network 10. In a second network configuration each core components 58 or leaf components 59 is responsible for deployment optimization in its own domain, typically under the supervision of a parent core component 58. In a third network configuration, two or more parallel hierarchies are provided. For example, a first hierarchy is based on geographical distribution of hardware units, a second hierarchy is based on services, or chains of VNFs 50 and/or VNF instances 51 (irrespective of their geographical locality), and a third hierarchy is based on customers (irrespective of their geographical locality or service chains).

It is appreciated that in some cases, or configurations, of the NFV-O system, a core component may supervise itself, or function as its own supervisor. For example, the root component of a hierarchy, or an NFV-O core component not connected to the root component.

VNF deployment optimization module 33 (and chain optimization module 34) of the NFV-O module 12 continuously investigate the development of loads and provide alternative deployment plans. Consequently, NFV-O module 12 redeploys VNFs 50 and VNF instances 51 and reallocates network resources accordingly. Such development of loads may be associated with customers' consumption of services, activities associated with preventive maintenance, hardware failure events and fault recovery processes, security related events, security breaches and associated recovery processes, etc.

Software (e.g. VNFs 50 and/or VNF instances 51) deployment optimization may be indicated when one part of NFV-based network 10 is over-loaded (or approaches an overload situation) while another part of NFV-based network 10 is relatively idle. The redeployment migrates some of the network entities (e.g., VNFs 50 and VNF instances 51) from the overloaded part of NFV-based network 10 to the relatively idle part of NFV-based network 10 to free resources where needed mostly. Therefore, the deployment optimization and redeployment activities follow the changes of load distribution.

Therefore, the topology, or the hierarchical structure, of NFV-O 12 affects its effectiveness. The NFV-O effectiveness may be evaluated using the following measurements: the amount of processing required to optimize the deployment of VNFs 50 and VNF instances 51; the time it takes to redeploy VNFs 50 and VNF instances 51 and to overcome situations of overload, insufficient QoS, failure to meet SLA, etc.; and network usage efficiency, or the amount of hardware units and particular network resources required to meet SLA, QoS and other performance requirements, or the amount of unused hardware units and/or network resources.

NFV-O management module 13 manages the topology, or the hierarchical structure, of NFV-O 12, and/or the deployment of core components 58 or leaf components 59 of the NFV-O 12. In this respect NFV-O management module 13 provides various services, such as planning the topology, or the hierarchical structure, of NFV-O 12, and/or the deployment of core components 58 or leaf components 59 so that software deployment optimization is effective. For example, as described above, that deployment optimization requires less processing power, is provided in time, and requires less hardware units and network resources.

Such services also include modifying the topology, or the hierarchical structure, of NFV-O 12, and/or the deployment of core components 58 or leaf components 59 in real-time, or near real-time, according to changes in the network behavior. In some cases, only the association of hardware units and/or VNF-Is to the NFV-O leaf components is changed and the overall hierarchy is preserved. In other situations changes to the NFV-O leaf components changes though at least part of the hierarchy of NFV-O core components.

The services also include recovering the optimal topology, or the optimal hierarchical structure, of NFV-O 12, and/or the optimal deployment of core components 58 or leaf components 59, after it has been modified.

For example, an NFV-O hierarchy having a fine hierarchical granularity, such as provided by many small leaf components 59, may provide higher NFV-O effectiveness. The term small NFV-O leaf component may, for example, mean that the leaf component is assigned less hardware units. The small NFV-O leaf component may therefore manage its domain, for example process redeployment when needed, using less processing power, or respond faster to load event and similar situations as described above.

However, a small leaf component 59 is also more likely to be saturated, for example lacking enough resources to supply a load event. A small leaf component may therefore experience such saturation repeatedly, or more often, than a larger NFV-O leaf component. In case of NFV-O leaf saturation, its supervising core components 58 may need to assign the saturated leaf component resources from one or more other leaf components 59. Such a process of topology modification in a hierarchy including many small leaf components 59 may traverse through several leaf components 59, typically causing fragmentation.

It is appreciated that the term NFV-O topology may include the following aspects: the structure of the NFV-O network, such as the network of core components 58 and leaf components 59 and their internal relations; the association of processing elements, such as hardware unit 23 or CMS 61, to particular NFV-O modules, such as core components 58 and leaf components 59, forming their respective domains; the association of particular NFV-O modules, such as core components 58 and leaf components 59, with particular customers, type of customers, services, type of services, etc. which may also be considered as their respective domains.

It is appreciated that in some situations a single NFV-O module, and/or a network, or hierarchy, of NFV-O module (such as a network of core components 58 and leaf components 59 as described with reference to FIG. 5) may span two or more NFV-based networks 10. In such situation, for example, one network of NFV-O modules associated with a particular customer or service may overlap two or more networks of NFV-O modules associated with processing elements such as hardware unit 23 or CMS 61.

Reference is now made to FIG. 6A, FIG. 6B, and FIG. 6C, which are simplified illustrations of an NFV-O deployment in three situations, according to one embodiment. FIG. 6A illustrates an initial deployment 62 of two lower layers of an NFV-O hierarchy. FIG. 6B illustrates a progressive deployment 63 (or redeployment) of the two lower layers of the NFV-O hierarchy. FIG. 6C illustrates a 'fragmented' aspect of the two lower layers of the NFV-O hierarchy.

As an option, FIGS. 6A, 6B, and 6C may be viewed in the context of the details of the previous Figures and particularly in the context of FIG. 5. Of course, however, FIGS. 6A, 6B, and 6C may be viewed in the context of any desired environment. Further, the aforementioned definitions may equally apply to the description below.

It is appreciated that FIGS. 6A, 6B, and 6C display an illustrative example of an example of a topology of an NFV-O hierarchy for at least a part of an NFV-based network 10.

FIG. 6A shows 36 NFV-O domains 64. Each NFV-O domain may be managed by a respective NFV-O module 12, which may be a leaf component 59. The NFV-O modules 12, or leaf components 59, are not shown in FIGS. 6A, 6B, and 6C.

Domains 64 are shown as equal squares, however, each of domains 64 may have any shape and size. Domains 64 are grouped in four domain groups 65 (or super-domains) of 9 domains 64 each. It is appreciated that this particular grouping is provided for simplicity, and that other groups are possible. The four groups are designated by different hatching patterns.

In the example of FIG. 6A, each of the groups 65 is managed by a respective NFV-O module 12, which may be a core component 58 of a higher level of the NFV-O hierarchy. The NFV-O modules 12, or core components 58, are not shown in FIGS. 6A, 6B, and 6C. Each of the NFV-O modules 12, or core components 58, managing a particular group 65 practically manages the leaf components 59 that manage, each, one of the domains 64 of that particular group 65.

Each of these four NFV-O modules 12, or core components 58, may be managed by a superior, or supervising, NFV-O module 12, which may be a core component 58, of a higher level of the NFV-O hierarchy, such as a root NFV-O module 12 (such as root component 60 of FIG. 5, not shown in FIGS. 6A, 6B, and 6C). For the example of FIG. 6A it is assumed that a single NFV-O module 12, which may be a core component 58, manages the four subordinate NFV-O modules 12, which may be a core components 58, each managing 9 subordinate NFV-O modules 12, or leaf components 59.

It is appreciated that each of domains 64 may include one or more computing resources of one or more types, such as hardware units 23 such as shown in FIGS. 2 and 4 and/or CMS 61 as shown in FIG. 5. The root NFV-O module 12, the NFV-O modules 12 managing groups 65 (e.g., core components 58), and the NFV-O modules 12 managing domains 64 (e.g., leaf components 59) may be allocating or assigning resources (e.g., hardware units 23, CMS 61, etc.) to VNFs 50 and VNF instances 51, and/or VNFs 50 and VNF instances 51 to resources (e.g., hardware units 23, CMS 61, etc.).

For example, in a first step, a core component 58 functioning as root component 60 organizes the next highest layer of NFV-O deployment by assigning resources (e.g., hardware units 23, CMS 61, etc.) to subordinate core components 58. In the example shown by FIG. 6A this step creates groups 65. In other words, in this first step, root component 60 assigns resources to groups 65 and their respective core components 58.

In a second step, each core component 58 managing its respective group 65 may organize the next highest layer of NFV-O deployment by assigning resources (e.g., hardware units 23, CMS 61, etc.) assigned to the group 65 to subordinate leaf components 59, thus creating the domains 64.

It is appreciated that the distribution or topology of the domains may be created on a physical basis, such as according to the physical distance between the allocated resources (e.g., hardware units 23, CMS 61, etc.). Alternatively, the distribution or topology of the domains may be created according to the network topology, or transmission distance or bandwidth, between the allocated resources. Alternatively, the distribution or topology of the domains may be created on a logical, or usage, basis, such as according to the type of services rendered, or according to the type or pattern of consumption, or according to customers. It is appreciated that two or more NFV-O hierarchies of different types may at least partly overlap, that is, manage the same plurality of resources.

Thereafter, in a process generally referred to as 'VNF deployment' (or deployment optimization) leaf components 59 managing their respective domains 64 may allocate, or assign, resources (e.g., hardware units 23, CMS 61, transmission links, power, cooling, etc., and/or their components) to VNFs 50 and VNF instances 51, and/or vice-versa. For example, a particular quota of one or more resources such as processing power, memory, transmission capacity, priority, storage, cooling, energy, etc., is allocated to a particular VNF instance.

If a particular leaf component 59 runs out of one or more resources (e.g., hardware units 23, CMS 61, transmission links, power, cooling, etc., and/or their components, etc.) in its respective domain 64, the leaf component 59 may apply to its supervising (parent) core component 58 requesting additional resource(s). The supervising core component 58 may allocate, or assign, to the requesting leaf components 59 resources (e.g., hardware units 23) from other domains 64 it supervises. Alternatively, the core component 58 may apply its parent core component 58 for additional resources from another group 65.

Therefore, the process of VNF deployment may affect the structure of the NFV-O hierarchy and the allocation of resources to core component 58 and leaf components 59. FIG. 6B shows an exemplary schematice illustration of how the two lower layers of the NFV-O hierarchy may look like after several leaf components 59 have performed VNF redeployment and subsequently their respective core components 58 have also requested additional resources. FIG. 6B shows an exemplary schematice illustration how some core component 58 and leaf components 59 may be allocated resources previously allocated to other groups 65 and domains 64.

As shown in FIG. 6B, some groups 65 and domains 64 may grow while other may shrink. Some groups 65 and domains 64 may even be allocated resources within remote (non-adjacent) domains 64 forming detached resource islands such as those designated by numeral 66. For example, when a particular service requires a front-end processing facility closer to a particular customer.

Later, as shown in FIG. 6C, when various loads decrease or move to other parts of the NFV-based network 10, the distribution of the groups 65 and domains 64 may be different from the initial distribution of the groups 65 and domains 64 as depicted in FIG. 6A. Furthermore, the distribution of FIG. 6C shows a plurality of resource islands 66. Some of the resource islands 66 (designated by cross hatching) are at least partly used, and some of the resource islands 66 (designated as empty circles) are mostly available. The distribution of resources (e.g., hardware units 23, CMS 61, etc.) to groups 65 and domains 64 as depicted in FIG. 6C is clearly inefficient, particularly with reference to the resource islands 66.

Typically, when a resource is reassigned from one domain 64 to another the resource is assigned to the receiving domain, and/or to the NFV-O component (e.g. leaf components 59) with a requirement to surrender the resource when the condition requiring the resource (e.g., increased load) are removed (e.g., the particular load sufficiently decreases). However, even with such mechanism, a complex and/or repetitive process of VNF redeployment associated with a complex and/or repetitive process of NFV-O redeployment may create one or more deadlocks, or a network of deadlocks.

In this respect, a deadlock means, for example, that a first domain has been assigned a first resource from a second domain, and has provided a second resource to a third domain, and therefore cannot surrender the first resource before the second resource is recovered. A chain of such resource reallocations may create a deadlock.

It is appreciated that in some cases the first and second resources may be of different types. For example, where transmission requirements (e.g., bandwidth, latency, etc.) create linkage between different types of resources. In such case, a first resource cannot be surrendered, not because it is unavailable in the relevant domain, but because another type of resource is not available with sufficient transmission in between (and such resource has been provided to another domain).

The NFV-O management module 13 may be operative to perform a process by which the structure of the NFV-O hierarchy may be returned to an optimized structure, such as, for example, the initial structure as depicted in FIG. 6A. However, it is appreciated that an optimal structure may be different from the initial structure.

To arrive at an optimal NFV-O deployment (i.e., structure, hierarchy), the NFV-O management module 13 may, for example, record the process in which the structure NFV-O hierarchy (NFV-O deployment) is being modified due to the development of loads, and then recovered when the loads reduce. The NFV-O management module 13 may then analyze the recorded repetitive process of NFV-O hierarchy modification and recovery, to form an optimized initial NFV-O deployment (e.g. the initial structure NFV-O hierarchy as, for example, depicted by FIG. 6A).

Reference is now made to FIG. 7, which is a simplified diagram of a linear chain 67 of domains connected by annexed resources, according to one embodiment.

As seen in FIG. 7, a domain 68 includes at least one resource (or group of resources) 69 that is annexed to a domain 70. Similarly, domain 70 includes at least one resource (or group of resources) 71 that is annexed to a domain 72. Annexed resources 69 and 71 may be of any type and size, and of different types and sizes. Chain 67 may be longer than the three domains shown in FIG. 7.

The chain may have one or more splits in which a domain (such as domain 70 may have annexed resources (such as annexed resource 69) in two or more different domains (such as domain 68). The chain may also have one or more joins in which a two or more domains (such as domain 70 may each have one or more annexed resources (such as annexed resource 69) in the same domain (such as domain 68). As seen in FIG. 7, the domains may belong to the same domain group, or to any number of domain groups (such as groups 65 of FIG. 6A).

A chain is automatically resolved when its annexed resources are surrendered to their respective original domains, for example, when the load decreases. A chain may not be automatically resolved for many reasons. One main reason is that a particular domain, usually at an end of the chain, does not have enough resources of the required type to surrender the annexed resource, which may be of the same type or of a different type. A domain may lack the required resources because it has been decreased, because an empty resource island has been left (such as resource island 73, due to fragmentation (there is enough of the resource type, but not in a single unit or location), etc. Another cause that may disable a chain from being automatically resolved is that the chain is closed on itself, or a part of the chain includes a loop.

Reference is now made to FIG. 8, which shows a simplified diagram of a circular or loop chain 74 of domains connected by annexed resources, according to one embodiment.

As seen in FIG. 8, a domain 75 includes at least one resource (or group of resources) 76 that is annexed to a domain 77. Similarly, domain 77 includes at least one resource (or group of resources) 78 that is annexed to a domain 79. Additionally, domain 79 includes at least one resource (or group of resources) 80 that is annexed back to a domain 75. The annexed resources may be of any type and size, and of different types and sizes. Chain 74 may be longer than the three domains shown in FIG. 7 and have several interconnected loops.

One of the goals of the NFV-O management module 13 is to resolve chains of domains connected by annexed resources such as chains 67 and 74. In this task NFV-O management module 13 may scan the intermediate (current) NFV-O deployment (such as deployment 63 of FIG. 6B), compare it to the initial NFV-O deployment (such as deployment 62 of FIG. 6A), identify annexed resources, identify chains of domains connected by annexed resources, identify the cause that prevents the resolution of the chain, and resolve the chain.

Resolving the chain may be effected by instructing an NFV-O module of a particular domain, or its parent NFV-O module, to perform VNF deployment optimization process, generate a new VNF deployment plan and implement it in a manner that will enable the chain to be resolved. Resolving the chain may also be effected by instructing a parent NFV-O module to provide a particular resource to a particular domain so as to start the process that resolves the chain.

Figure 9A:
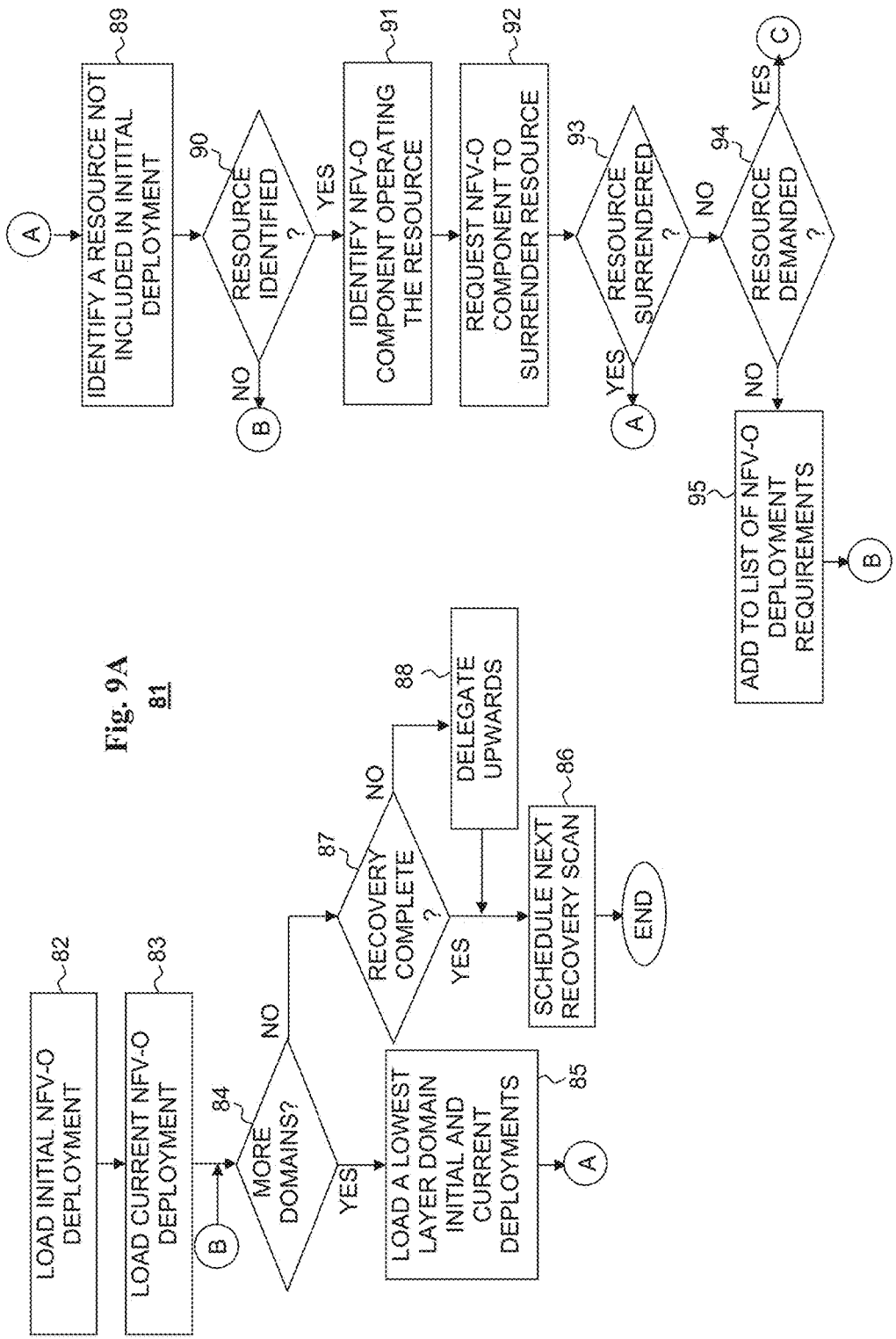
FIG. 9A and FIG. 9B, taken together, show a simplified flow-chart of an NFV-O deployment recovery process executed by an NFV-O management module, in accordance with one embodiment.
Figure 9B:
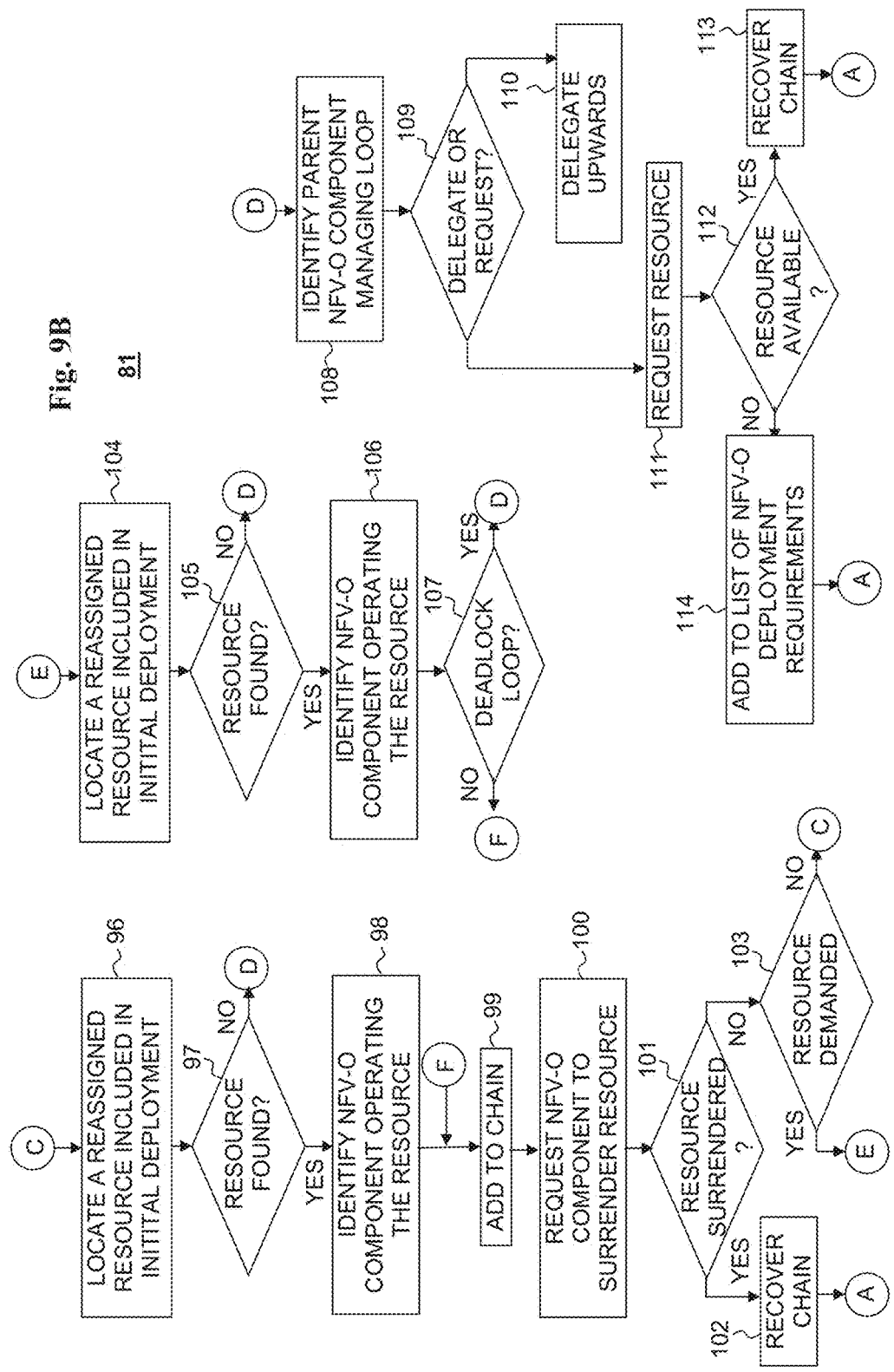

Reference is now made to FIG. 9A and FIG. 9B, which, taken together, are a simplified flow-chart of an NFV-O deployment recovery process 81 executed by NFV-O management module 13, according to one embodiment.

As an option, FIGS. 9A and 9B may be viewed in the context of the details of the previous Figures and particularly in the context of FIGS. 5, 6A, 6B, and 6C. Of course, however, the flow chart of NFV-O deployment recovery process 81 may be viewed in the context of any desired environment. Further, the aforementioned definitions may equally apply to the description below. NFV-O deployment recovery process 81 may also be named NFV-O recovery process, deployment recovery process, or simply recovery process.

It is appreciated that a recovery process 81 may be executed by a NFV-O management module 13 of an NFV-O module 12 such as an NFV-O core component 58. Such NFV-O modules 12, being an NFV-O core component 58, is managing a group 65 of domains 64, and/or a plurality of NFV-O leaf components 59. Alternatively, a recovery process 81 may be executed by a NFV-O management module 13 of an NFV-O module 12 such as an NFV-O core component 58 supervising a plurality of NFV-O core components 58. Alternatively, a recovery process 81 may be executed by a NFV-O management module 13 of an NFV-O module 12 such as a root NFV-O component 58

As shown in FIG. 9A, recovery process 81 may start in step 82 by loading an initial NFV-O deployment data, such as the initial NFV-O deployment shown in FIG. 6A. Recovery process 81 may then proceed to step 83 to load a current NFV-O deployment data, such as the NFV-O deployment shown in FIG. 6B.

Recovery process 81 may then proceed to steps 84 and 85 to scan the lower level domains (e.g., domains 64 of FIGS. 6A and 6B). When all the domains are scanned recovery process 81 may schedule another scan (step 86). If the recovery process is incomplete, such as that one or more domains have not been sufficiently recovered (step 87), for example, if one or more detached resources (resource islands) still exist, recovery process 81 may report the situation (step 88) to a higher level (supervising, parent) NFV-O module (e.g., a parent core component 58).

It is appreciated that when an NFV-O recovery problem or situation is delegated (reported) to a higher authority (a parent core component 58) it is collected into a respective storage or database forming a "current NFV-O deployment" for the higher authority. Thereafter, the parent core component 58 (the higher authority) may invoke its NFV-O management module 13, executing its recovery process 81, loading, in step 83 the current NFV-O deployment. This current NFV-O deployment data may be based on the collected NFV-O recovery failure reports received from subordinate (child) core components 58 or leaf components 59 when the perform step 88.

It is appreciated that NFV-O management module 13 and recovery process 81 as described herein may be used by any of the NFV-O modules (e.g., core components 58 or leaf components 59) in the NFV-O hierarchy for their respective domains. It is appreciated that when a supervising (parent) NFV-O module is executing recovery process 81 for its domain, the supervising (parent) NFV-O module may instruct its subordinate (child) NFV-O modules not to execute recovery process 81. In such case, for example, the internal NFV-O recovery processes are disabled for all the subordinate (child) NFV-O modules while the supervising (parent) NFV-O module performs its NFV-O recovery processes (recovery process 81). It is appreciated that the supervising (parent) NFV-O module may also instruct its subordinate (child) NFV-O modules not to execute VNF deployment optimizations and/or service optimizations during this period.

It is appreciated that the process of delegating NFV-O recovery problem upwards (e.g., step 88) may repeat until it reaches the root NFV-O component.

In step 85 the recovery process 81 may load the initial and the current VNF deployments and then, in step 89, recovery process 81 may try to recover a resource currently included in the scanned domain, but not included in the initial domain (e.g., an annexed resource). If no such resource is identified (step 90) the scan of the domain is completed and recovery process 81 proceeds to the next domain.

If an annexed resource is identified, recovery process 81 may proceed to steps 91 and 92 to request the NFV-O module currently managing the resource to release the annexed resource. The NFV-O module currently managing the resource is, for example, the NFV-O module currently managing the domain currently scanned. If the annexed resource is released in step 93 (for example, surrendered to the NFV-O module from which it has been reallocated to the current NFV-O module) the recovery is successful and the recovery process 81 may continue to search for another annexed resource.

It is appreciated that steps 89, 90, 91, and 92 may be executed by an NFV-O core component supervising both the NFV-O core or leaf component to which the (annexed) resource has been initially allocated, and the NFV-O core or leaf component where the (annexed) resource is currently allocated (e.g., the NFV-O component identified as "operating the resource").

If the resource is not released, the NFV-O module currently managing the resource may issue a demand for a resource (step 94), to enable the release of the annexed resource. As described above, the requested resource may be of the same type as the annexed resource or of a different type. A request for a resource may be issued for several reasons such as: the NFV-O module currently managing the domain was not allocated enough of the particular resource type in the initial deployment; the NFV-O module managing the current domain provided resources of the particular type to other domains and/or NFV-O modules (such resources are not yet surrendered back to the NFV-O module managing the current domain); the annexed resource is associated with another resource, which may be of a different type, for example by a performance requirement such as a transmission requirement such as bandwidth, latency, jitter, etc. The NFV-O module managing the current domain may lack the other resource for any reason such as the two reasons listed above. Such association may result, for example, from the resource being allocated to a multi-VNF service, e.g., a VNF chain.

If the resource is not surrendered and a resource demand is not issued the recovery process 81 may add the current allocation (of the annexed resource to the current domain) to the NFV-O deployment requirements (step 95). This may mean that the current allocation of the particular resource to the particular domain is standing, and should be considered when an optimized NFV-O deployment is recalculated.

For example, a particular NFV-O module mar be assigned a particular domain. The domain may be associated with a particular service, or a particular customer. The service may be centralized in the domain but may need 'branches', or remote 'front-end processing facilities', depending on the distribution of the service or customer and their respective needs (such as processing power, bandwidth, etc.). The need for the annexed resource may therefore be 'standing', or permanent, or repetitive, and may therefore have presence in the initial NFV-O deployment.

Turning to FIG. 9B, if the recovery process 81 receives a resource demand the recovery process 81 proceeds to step 96 to scan the initial deployment for the demanded resource that has been reallocated to another domain. That is, the recovery process 81 seeks a resource of the type of the resource demanded that has been initially assigned to the current domain and thereafter reassigned (exported) to another domain.

If the recovery process 81 finds such exported resource (step 97) the recovery process 81 may proceed to step 98 to identify the NFV-O module currently managing the exported resource. The recovery process 81 may then (step 99) add the resource with its managing NFV-O to a chain of annexed resources requiring recovery (e.g., to be surrendered to their original domains).

The recovery process 81 may then request (step 100) the NFV-O module currently managing the exported resource to surrender the exported resource. If the resource is surrendered (step 101) the recovery process 81 recovers the chain of resources (step 102). If all the resources in the current chain are surrendered to their original (initial) domains the recovery process 81 continues to another resource or another domain.

It is appreciated that the step of recovering the chain of resources (e.g., step 102) may involve returning to the previous NFV-O module and repeating the request to surrender the relevant resource. Such process may involve repeating steps 92 and onward.

It is also appreciated that the step of recovering the chain of resources (e.g., step 102) may involve returning to the previous NFV-O module and repeating the request to surrender the relevant resource, which may result in a further demand for a resource, for example if the resource surrendered in step 101 is insufficient to replace the resource requested in step 92. In such case, recovery process 81 may repeat steps 96 to 102.

In step 96, recovery process 81 may search for a resource of the highest value, or for a resource of the best fit value, or the resource of the lowest value, depending on the recovery strategy. The term value herein refers to the amount of the resource that have been reassigned, compared with the amount of the particular type of resource that is needed to resolve the situation.

If in step 101 the resource is not surrendered and the recovery process 81 may receive (step 103) a further demand for a resource. Recovery process 81 may then proceed to execute steps 104, 105, and 106, practically repeating steps 96, 97, and 98. If the newly located resource does not create a loop to a previous domain or NFV-O module (step 107), the recovery process 81 may proceed to steps 99 to 103. In this manner, recovery process 81 may create a chain of resources for recovery. Once the last resource is surrendered the entire chain is recovered.

If recovery process 81 identifies a chain in a deadlock loop (step 107), or if all the resources are checked and are insufficient to recover the chain (step 105), recovery process 81 may access a parent NFV-O module, such as a parent NFV-O module supervising the entire chain (step 108). Recovery process 81 may then determine (step 109) whether to delegate the situation to the supervising NFV-O module (step 110) or to request (step 111) a resource to resolve the situation. If such resource is available (step 112) recovery process 81 recovers the chain (step 113). Otherwise (step 114) recovery process 81 may add the chain to the list of requirements for further NFV-O deployment optimization.

As disclosed above, the initial NFV-O deployment (such as deployment 62 of FIG. 6A), and intermediate (current) NFV-O deployments (such as deployment 63 of FIG. 6B) are reported to, collected and stored by, NFV-O management module 13. NFV-O management module 13 then process this data to schedule and execute recovery process 81, and to schedule and execute NFV-O deployment optimization procedure.

The NFV-O deployment optimization procedure generates a new deployment of the NFV-O hierarchy, or, in other words, generates a new assignment of resources (such as hardware units 23, CMS 61, etc.) to domains 64, assignment of domains 64 to groups 65, and so on to create an optimized NFV-O deployment, or hierarchy, or topology. The new NFV-O deployment will then serve as a new initial NFV-O deployment.

It is appreciated that certain features of the invention, which are, described in the context of different embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

Figure 10:
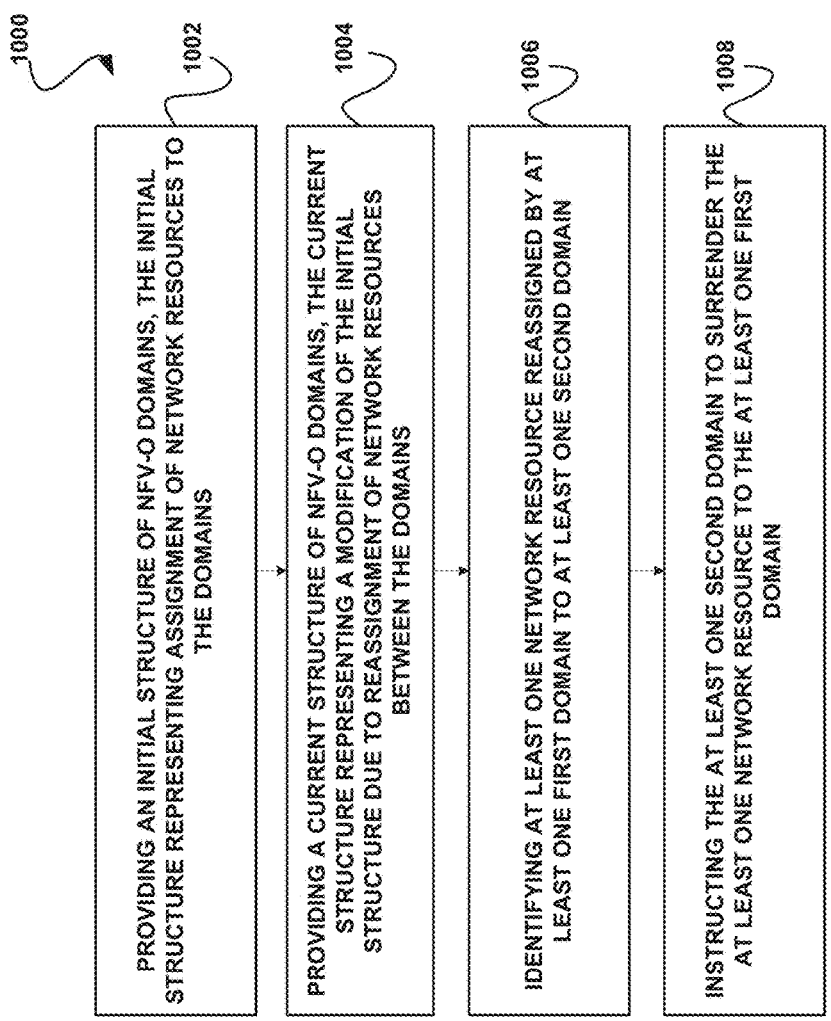
FIG. 10 illustrates a method for recovering a structure of network function virtualization orchestration (NFV-O) domains, in accordance with one possible embodiment.

FIG. 10 shows a method 1000 for recovering a structure of network function virtualization orchestration (NFV-O) domains, in accordance with one embodiment. As an option, the method 1000 may be implemented in the context of the details of the previous figures and/or any subsequent figure(s). Of course, however, the method 1000 may be implemented in the context of any desired environment. Further, the aforementioned definitions may equally apply to the description below.

As shown, the method includes: providing an initial structure of NFV-O domains, the initial structure representing assignment of network resources to the domains (see operation 1002); providing a current structure of NFV-O domains, the current structure representing a modification of the initial structure due to reassignment of network resources between the domains (see operation 1004); identifying at least one network resource reassigned by at least one first domain to at least one second domain (see operation 1006); and instructing the at least one second domain to surrender the at least one network resource to the at least one first domain (see operation 1008). The at least one network resource is a part of a communication network using network function virtualization (NFV-based network) orchestration. Additionally, the NFV-based network comprises a plurality of network resources assigned to domains managed by respective NFV-O modules.

In one embodiment, identifying at least one network resource comprises identifying a chain of network resources. In this case, surrendering at least one first network resource of the chain of network resources may be conditioned on surrendering at least one second network resource of the chain of network resources. Further, in one embodiment, identifying at least one network resource may comprise identifying a loop within the chain of network resources.

Additionally, in one embodiment, the method 1000 may include requesting a parent NFV-O module to assign a resource to the second domain. In this case, the NFV-based network may comprise a hierarchy of NFV-O modules and at least one parent NFV-O module may manage at least one plurality of subordinate NFV-O modules, each managing at least one of: a respective domain; and a second plurality of NFV-O modules.

Further, in one embodiment, the method 1000 may include modifying the initial structure of NFV-O domains to minimize at least one of: identifying at least one network resource reassigned by at least a first domain to at least a second domain; and instructing the at least second domain to surrender the network resource to the at least first domain; and frequency of operating at least one of the steps of: identifying at least one network resource reassigned by at least a first domain to at least a second domain; and instructing the at least second domain to surrender the network resource to the at least first domain.

Still yet, in one embodiment, the method 1000 may include evaluating the modification of the initial structure due to reassignment of network resources between the domains to form a measure of network fragmentation; and scheduling at least one of the steps of: identifying at least one network resource reassigned by at least a first domain to at least a second domain; and instructing the at least second domain to surrender the network resource to the at least first domain, according to the measure of network fragmentation.

Figure 11:
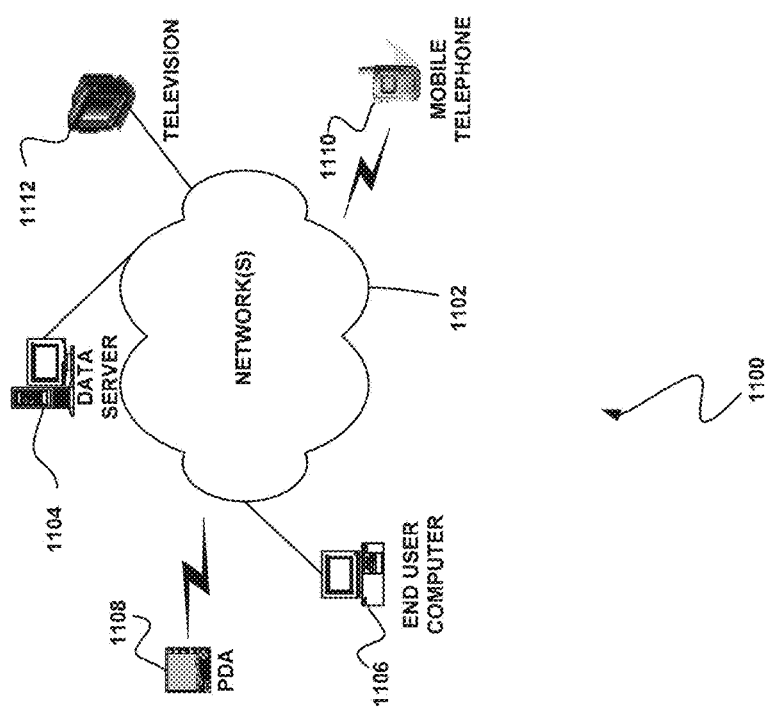
FIG. 11 illustrates a network architecture, in accordance with one possible embodiment.

FIG. 11 illustrates a network architecture 1100, in accordance with one possible embodiment. As shown, at least one network 1102 is provided. In the context of the present network architecture 1100, the network 1102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1102 may be provided.

Coupled to the network 1102 is a plurality of devices. For example, a server computer 1104 and an end user computer 1106 may be coupled to the network 1102 for communication purposes. Such end user computer 1106 may include a desktop computer, lap-top computer, and/or any other type of logic. Still yet, various other devices may be coupled to the network 1102 including a personal digital assistant (PDA) device 1108, a mobile phone device 1110, a television 1112, etc.

Figure 12:
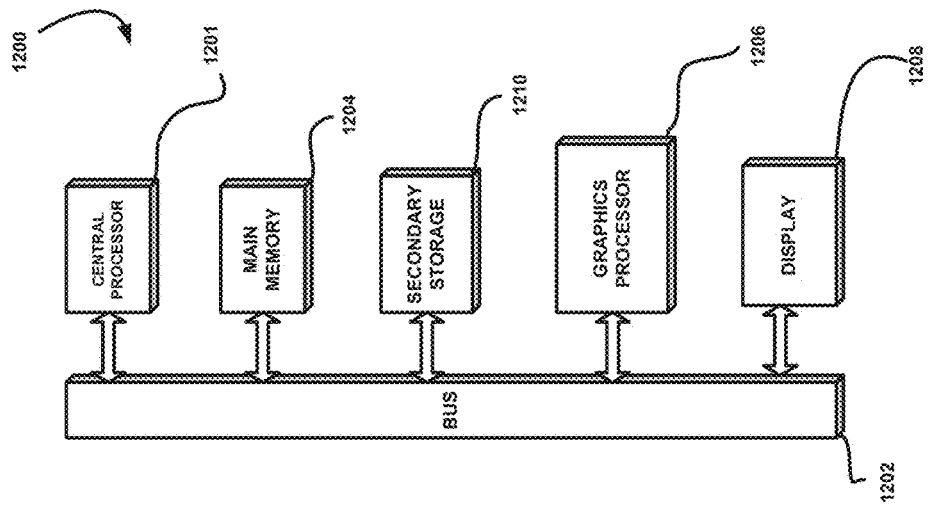
FIG. 12 illustrates an exempla system, in accordance with one embodiment.

FIG. 12 illustrates an exemplary system 1200, in accordance with one embodiment. As an option, the system 1200 may be implemented in the context of any of the devices of the network architecture 1100 of FIG. 11. Of course, the system 1200 may be implemented in any desired environment.

As shown, a system 1200 is provided including at least one central processor 1201 which is connected to a communication bus 1202. The system 1200 also includes main memory 1204 [e.g. random access memory (RAM), etc.]. The system 1200 also includes a graphics processor 1206 and a display 1208.

The system 1200 may also include a secondary storage 1210. The secondary storage 1210 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1204, the secondary storage 1210, and/or any other memory, for that matter. Such computer programs, when executed, enable the system 1200 to perform various functions (as set forth above, for example). Memory 1204, storage 1210 and/or any other storage are possible examples of non-transitory computer-readable media.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for recovering a structure of network function virtualization orchestration (NFV-O) domains, the method comprising:
   identifying an initial structure of NFV-O domains representing assignment of network resources to the NFV-O domains, each of the NFV-O domains being managed by a respective NFV-O module that allocates the network resources assigned thereto to virtual network function (VNFs) instances;
   identifying a current structure of NFV-O domains representing a modification of the initial structure due to reassignment of network resources between the NFV-O domains to support changing loads between the NFV-O domains;
   determining, from the initial structure of NFV-O domains and the current structure of NFV-O domains, one of the network resources reassigned by a first NFV-O domain of the NFV-O domains to a second NFV-O domain of the NFV-O domains;
   responsive to determining the one of the network resources reassigned by the first NFV-O domain to the second NFV-O domain, performing a recovery process including:
      instructing a second NFV-O module managing the second NFV-O domain to release the identified one of the network resources for assignment back to the first NFV-O domain;
   determining that a process including the modification of the initial structure and the recovery process is repeated;
   responsive to determining that the process including the modification of the initial structure and the recovery process is repeated:
      recording the repeated process,
      analyzing the repeated process, and
      forming, based on the analysis, an optimized initial structure of NFV-O domains.

2. A computer program product embodied on a non-transitory computer readable medium for recovering a structure of network function virtualization orchestration (NFV-O) domains, the computer program product comprising computer code for:
   identifying an initial structure of NFV-O domains representing assignment of network resources to the NFV-O domains, each of the NFV-O domains being managed by a respective NFV-O module that allocates the network resources assigned thereto to virtual network function (VNFs) instances;
   identifying a current structure of NFV-O domains representing a modification of the initial structure due to reassignment of network resources between the NFV-O domains to support changing loads between the NFV-O domains;
   determining, from the initial structure of NFV-O domains and the current structure of NFV-O domains, one of the network resources reassigned by a first NFV-O domain of the NFV-O domains to a second NFV-O domain of the NFV-O domains;
   responsive to determining the one of the network resources reassigned by the first NFV-O domain to the second NFV-O domain, performing a recovery process including:
      instructing a second NFV-O module managing the second NFV-O domain to release the identified one of the network resources for assignment back to the first NFV-O domain;
   determining that a process including the modification of the initial structure and the recovery process is repeated;
   responsive to determining that the process including the modification of the initial structure and the recovery process is repeated:
      recording the repeated process,
      analyzing the repeated process, and
      forming, based on the analysis, an optimized initial structure of NFV-O domains.

3. A system for recovering a structure of network function virtualization orchestration (NFV-O) domains, the system comprising:
one or more hardware processors for:
identifying an initial structure of NFV-O domains representing assignment of network resources to the NFV-O domains, each of the NFV-O domains being managed by a respective NFV-O module that allocates the network resources assigned thereto to virtual network function (VNFs) instances;
identifying a current structure of NFV-O domains representing a modification of the initial structure due to reassignment of network resources between the NFV-O domains to support changing loads between the NFV-O domains;
determining, from the initial structure of NFV-O domains and the current structure of NFV-O domains, one of the network resources reassigned by a first NFV-O domain of the NFV-O domains to a second NFV-O domain of the NFV-O domains;
responsive to determining the one of the network resources reassigned by the first NFV-O domain to the second NFV-O domain, performing a recovery process including:
instructing a second NFV-O module managing the second NFV-O domain to release the identified one of the network resources for assignment back to the first NFV-O domain;
determining that a process including the modification of the initial structure and the recovery process is repeated;
responsive to determining that the process including the modification of the initial structure and the recovery process is repeated:
recording the repeated process,
analyzing the repeated process, and
forming, based on the analysis, an optimized initial structure of NFV-O domains.

4. The method of claim 1, wherein the optimized initial structure of NFV-O domains is different from the initial structure of NFV-O domains and is formed by reallocating the network resources among the NFV-O domains.

* * * * *